(12) United States Patent
Komatsu et al.

(10) Patent No.: US 7,360,192 B2
(45) Date of Patent: Apr. 15, 2008

(54) MACROCELL, INTEGRATED CIRCUIT DEVICE, AND ELECTRONIC INSTRUMENT

(75) Inventors: Fumikazu Komatsu, Okaya (JP); Shoichiro Kasahara, Minowa-machi (JP); Mitsuaki Sawada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 465 days.

(21) Appl. No.: 11/013,707

(22) Filed: Dec. 17, 2004

(65) Prior Publication Data

US 2005/0134309 A1 Jun. 23, 2005

(30) Foreign Application Priority Data

Dec. 17, 2003 (JP) ............................. 2003-419238

(51) Int. Cl.
G06F 17/50 (2006.01)
G06F 9/45 (2006.01)
H03K 19/177 (2006.01)

(52) U.S. Cl. ..................... 716/8; 716/1; 716/9; 716/12; 326/47

(58) Field of Classification Search .................... 716/1, 716/12, 8, 9; 326/21, 47
See application file for complete search history.

(56) References Cited

U.S. PATENT DOCUMENTS 6,646,546 B1 * 11/2003 Butler et al. ................ 370/276
6,664,804 B2 * 12/2003 Nakada et al. ................ 326/21
6,707,314 B2 3/2004 Kasahara et al.

FOREIGN PATENT DOCUMENTS

JP A 2000-148716 5/2000
JP A 2002-343864 11/2002

* cited by examiner

Primary Examiner—Stacy A Whitmore
Assistant Examiner—Magid Y. Dimyan
(74) Attorney, Agent, or Firm—Oliff & Berridge, PLC

(57) ABSTRACT

A macrocell including a physical layer circuit includes a transmitter circuit and a receiver circuit connected with pads for differential signals DP and DM. The transmitter circuit includes a transmission driver which drives a signal line for the DP and a transmission driver which drives a signal line for the DM. When a direction from a side SD1 to a side SD3 of the macrocell is defined as a first direction, the transmission drivers are disposed on the side of the pads for the DP and DM in the first direction and are disposed line-symmetrically about a line SYL, and the receiver circuit is disposed on the side of the transmitter circuit in the first direction. A routing region of signal lines SLR1 and SLR2 for connecting the receiver circuit with the pads for the DP and DM is provided in the region between the transmission drivers.

30 Claims, 14 Drawing Sheets

MACROCELL, INTEGRATED CIRCUIT DEVICE, AND ELECTRONIC INSTRUMENT

Japanese Patent Application No. 2003-419238, filed on Dec. 17, 2003, is hereby incorporated by reference in its entirety.

BACKGROUND OF THE INVENTION

The present invention relates to a macrocell, an integrated circuit device, and an electronic instrument.

In recent years, Universal Serial Bus (USB) has attracted attention as an interface standard for connecting electronic instruments. The full speed (FS) mode in which data is transferred at 12 Mbps is defined in USB. The transfer rate of the FS mode is lower than the transfer rate of the high speed (HS) mode (480 Mbps) defined in USB 2.0. Therefore, an FS mode physical layer circuit (analog front-end circuit) is not placed by a manual operation using a CAD tool or the like, but is placed by an automatic placement/routing technique such as a gate array. Therefore, the placement positions of circuits which form the physical layer circuit are disposed at various locations in an integrated circuit device (semiconductor chip), and the placement positions are changed corresponding to the type of integrated circuit device. As a result, a problem occurs in which signal characteristics of USB differential signals (DP, DM) change corresponding to the type of integrated circuit device.

BRIEF SUMMARY OF THE INVENTION

A first aspect of the present invention relates to a macrocell which includes at least a circuit of a physical layer of a given interface standard in which data is transferred using differential signals, the macrocell including:
a transmitter circuit which is connected with a first pad for a first signal which forms the differential signals and a second pad for a second signal which forms the differential signals; and
a receiver circuit connected with the first and second pads,
wherein the transmitter circuit includes a first transmission driver which drives a first signal line connected with the first pad, and a second transmission driver which drives a second signal line connected with the second pad, and
wherein the first and second transmission drivers of the transmitter circuit are disposed on a first direction side of the first and second pads and are disposed line-symmetrically about a first line as a symmetry axis, and the receiver circuit is disposed on the first direction side of the transmitter circuit, the first direction being a direction from a first side of the macrocell towards a third side opposite to the first side, and the first line extending along the first direction.

A second aspect of the present invention relates to a macrocell which includes at least a circuit of a physical layer of a given interface standard in which data is transferred using differential signals, the macrocell including:
a transmitter circuit which is connected with a first pad for a first signal which forms the differential signals and a second pad for a second signal which forms the differential signals;
a receiver circuit connected with the first and second pads; and
a first resistor circuit for pull-up and a second resistor circuit as a dummy, the first resistor circuit being connected with the first pad and the second resistor circuit being connected with the second pad,
wherein the transmitter circuit includes a first transmission driver which drives a first signal line connected with the first pad, and a second transmission driver which drives a second signal line connected with the second pad,
wherein the first and second transmission drivers of the transmitter circuit are disposed on a first direction side of the first and second pads and are disposed line-symmetrically about a first line as a symmetry axis, the first direction being a direction from a first side of the macrocell towards a third side opposite to the first side, and the first line extending along the first direction, and
wherein the first and second resistor circuits are disposed on a second direction side of the transmitter circuit, the second direction being a direction from a second side of the macrocell towards a fourth side opposite to the second side.

A fourth aspect of the present invention relates to an integrated circuit device which includes a plurality of macrocells, including:
any one of the above macrocells; and
a second macrocell which includes an upper layer circuit of the physical layer.

A fifth aspect of the present invention relates to an electronic instrument, including:
the above integrated circuit device; and
a processing section which controls the integrated circuit device.

DETAILED DESCRIPTION OF THE EMBODIMENT

Figure 1:
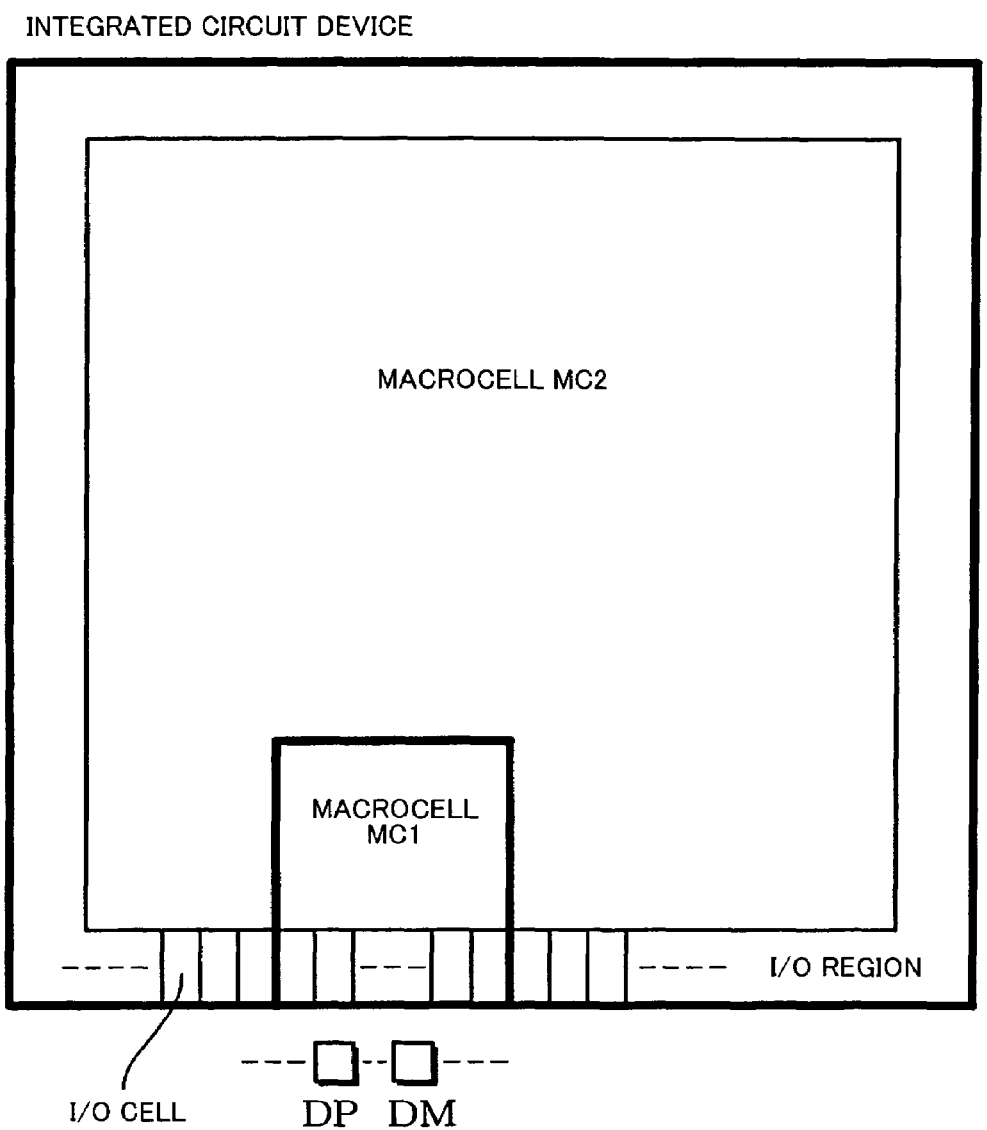
FIG. 1 shows an integrated circuit device according to one embodiment of the present invention.

An embodiment of the present invention may provide a macrocell which can maintain signal characteristics of differential signals and the like even if the macrocell is disposed at various locations, and an integrated circuit device and an electronic instrument including the same.

An embodiment of the present invention provides a macrocell which includes at least a circuit of a physical layer of a given interface standard in which data is transferred using differential signals, the macrocell including:

a transmitter circuit which is connected with a first pad for a first signal which forms the differential signals and a second pad for a second signal which forms the differential signals; and a receiver circuit connected with the first and second pads, wherein the transmitter circuit includes a first transmission driver which drives a first signal line connected with the first pad, and a second transmission driver which drives a second signal line connected with the second pad, and wherein the first and second transmission drivers of the transmitter circuit are disposed on a first direction side of the first and second pads and are disposed line-symmetrically about a first line as a symmetry axis, and the receiver circuit is disposed on the first direction side of the transmitter circuit, the first direction being a direction from a first side of the macrocell towards a third side opposite to the first side, and the first line extending along the first direction.

The macrocell in this embodiment includes the transmitter circuit and the receiver circuit as circuits of the physical layer (lowermost layer, for example) which transfers data using differential signals. The first and second transmission drivers of the transmitter circuit are line-symmetrically disposed on the first direction side of the first and second pads, and the receiver circuit is disposed on the first direction side of the transmitter circuit. This enables provision of a macrocell which can maintain signal characteristics of differential signals and the like even if the macrocell is disposed at various locations, and can reduce the area of the macrocell.

With this macrocell, a routing region may be disposed in a region between the first and second transmission drivers, the routing region being provided for routing a third signal line and a fourth signal line which are respectively provided for connecting the receiver circuit with the first and second pads along the first direction.

This enables the third and fourth signal lines provided for connecting the receiver circuit with the first and second pads to be routed by effectively using the free space between the line-symmetrically disposed first and second transmission drivers.

With this macrocell, the third and fourth signal lines in the routing region may be routed at line widths smaller than line widths of the first and second signal lines which respectively connect the transmitter circuit with the first and second pads.

This prevents a problem in which the first and second signal lines for connecting the transmitter circuit with the first and second pads are cut by electromigration when a large current supply capability is required for the transmitter circuit. On the other hand, since the line widths of the third and fourth signal lines for connecting the receiver circuit with the first and second pads are reduced, the distance between the first and second transmission drivers can be reduced. This decreases the area of the macrocell, for example.

With this macrocell, a shield line may be routed in the routing region along the third and fourth signal lines.

This prevents a problem in which signal noise from a peripheral circuit is superimposed on the third and fourth signal lines.

With this macrocell, the first and second pads may be disposed line-symmetrically about the first line as a symmetry axis.

This enables the parasitic capacitance and the parasitic resistance of the signal line which connects the first pad with the transmitter circuit or the receiver circuit to be easily made equal to the parasitic capacitance and the parasitic resistance of the signal line which connects the second pad with the transmitter circuit or the receiver circuit.

With this macrocell, the transmitter circuit may include first and second damping resistors which are connected with the first and second pads, respectively, and the first and second damping resistors may be disposed line-symmetrically about the first line as a symmetry axis.

This enables the signal characteristics of the differential signals to be maintained, for example.

With this macrocell, the receiver circuit may include a differential receiver connected with the first and second pads, a first single-end-receiver connected with the first pad, and a second single-end-receiver connected with the second pad.

With this macrocell, first and second transmission control circuits for respectively controlling the first and second transmission drivers may be disposed on the first direction side of the transmitter circuit, and the receiver circuit may be disposed in a region between the first and second transmission control circuits.

The enables effective use of the free space when the circuit area of the receiver circuit is smaller than the circuit area of the transmitter circuit, for example.

With this macrocell, a reception interface region and a transmission interface region may be disposed along the third side of the macrocell, the reception interface region being provided for interfacing a signal between the receiver circuit and a second macrocell which includes an upper layer circuit of the physical layer, and the transmission interface region being provided for interfacing a signal between the second macrocell and the first and second transmission control circuits.

This facilitates the timing design of the signal transferred between the macrocell and the second macrocell. Moreover, when the second macrocell is a macrocell of which the routing and the circuit cell placement are automatically implemented, the routing efficiency of the automatic placement and routing of the second macrocell can be increased, for example.

This macrocell may include a first resistor circuit for pull-up and a second resistor circuit as a dummy, the first resistor circuit being connected with the first pad and the second resistor circuit being connected with the second pad, and the first and second resistor circuits may be disposed on a second direction side of the transmitter circuit, the second direction being a direction from a second side of the macrocell towards a fourth side opposite to the second side.

Another embodiment of the present invention provides a macrocell which includes at least a circuit of a physical layer of a given interface standard in which data is transferred using differential signals, the macrocell including:

a transmitter circuit which is connected with a first pad for a first signal which forms the differential signals and a second pad for a second signal which forms the differential signals;

a receiver circuit connected with the first and second pads; and a first resistor circuit for pull-up and a second resistor circuit as a dummy, the first resistor circuit being connected with the first pad and the second resistor circuit being connected with the second pad, wherein the transmitter circuit includes a first transmission driver which drives a first signal line connected with the first pad, and a second transmission driver which drives a second signal line connected with the second pad, wherein the first and second transmission drivers of the transmitter circuit are disposed on a first direction side of the first and second pads and are disposed line-symmetrically about a first line as a symmetry axis, the first direction being a direction from a first side of the macrocell towards a third side opposite to the first side, and the first line extending along the first direction, and wherein the first and second resistor circuits are disposed on a second direction side of the transmitter circuit, the second direction being a direction from a second side of the macrocell towards a fourth side opposite to the second side.

This enables the first and second resistor circuits to be disposed closer together, whereby an adverse effect due to fluctuation of condition in the manufacturing process can be reduced.

Any of these macrocells may include a third resistor circuit for pull-down and a fourth resistor circuit for pull-down, the third resistor circuit being connected with the first pad and the fourth resistor circuit being connected with the second pad, and the third and fourth resistor circuits may be disposed on the second direction side of the transmitter circuit.

This enables the third and fourth resistor circuits to be disposed closer together, whereby an adverse effect due to fluctuation of condition in the manufacturing process can be reduced.

With any of these macrocells, the third and fourth resistor circuits may be resistor circuits for Universal Serial Bus (USB) On-The-Go (OTG).

With any of these macrocells, first and second resistor control circuits for respectively controlling the first and second resistor circuits may be disposed on the first direction side of the first and second resistor circuits.

This enables effective use of the free space, whereby the layout efficiency can be increased.

With any of these macrocells, a resistor control interface region may be disposed along the third side of the macrocell, the resistor control interface region being provided for interfacing a signal between the first and second resistor control circuits and a second macrocell which includes an upper layer circuit of the physical layer.

This facilitates the timing design of the signal transferred between the macrocell and the second macrocell. Moreover, when the second macrocell is a macrocell of which the routing and the circuit cell placement are automatically implemented, the routing efficiency of the automatic placement and routing of the second macrocell can be increased, for example.

With any of these macrocells, the given interface standard may be a Universal Serial Bus (USB) standard, and the transmitter circuit and the receiver circuit may be circuits for USB full speed mode.

With any of these macrocells, when an entire I/O region of the macrocell is disposed to overlap a part of an I/O region of a second macrocell which includes an upper layer circuit of the physical layer, and when a length of the first side of the macrocell is denoted by L and a pitch of I/O cells disposed in the I/O region of the second macrocell is denoted by PL, L=PL×N (N is an integer larger than one) may be satisfied.

This allows the macrocell to be disposed at various locations, whereby convenience can be increased. Moreover, signal characteristics of differential signals and the like can be maintained even if the macrocell is disposed at various locations.

A further embodiment of the present invention provides an integrated circuit device which includes a plurality of macrocells, including:

the macrocell as defined in claim 1; and a second macrocell which includes an upper layer circuit of the physical layer.

A still further embodiment of the present invention provides an electronic instrument, including:

the integrated circuit device as defined in claim 24; and a processing section which controls the integrated circuit device.

The embodiments of the present invention are described below in detail. Note that the embodiments described hereunder do not in any way limit the scope of the invention defined by the claims laid out herein. Note also that not all of the elements of these embodiments should be taken as essential requirements to the means of the present invention.

1. Configuration of Integrated Circuit Device

FIG. 1 shows an integrated circuit device to which a macrocell according to one embodiment of the invention is applied. The integrated circuit device includes a macrocell MC1 and a second macrocell MC2. The macrocells MC1 and MC2 (megacell or macroblock) are units of medium-scale or large-scale circuits having a logic function. The integrated circuit device in this embodiment may include three or more macrocells.

In FIG. 1, the macrocell MC1 is a macrocell which includes at least a circuit of a physical layer in an interface standard (USB or IEEE 1394, for example) in which data is transferred using differential signals (serial bus). The physical layer circuit may include a transmitter circuit (first and second transmission drivers), a receiver circuit (differential receiver and first and second single-end-receivers), and a resistor circuit (pull-up resistor circuit and pull-down resistor circuit) which implements the USB full speed (FS) mode, for example. The macrocell MC1 may include a circuit (logical layer circuit or the like) other than the physical layer circuit.

The macrocell MC1 is a hard macro of which the routing and the circuit cell placement are fixed, for example. In more detail, the routing and the circuit cell placement are achieved by a manual layout (part of the routing and placement may be automated).

The macrocell MC2 is a macrocell which includes an upper layer of the physical layer (logical layer, link layer, transaction layer, or application layer, for example). Taking USB as an example, the macrocell MC2 may include a logical layer circuit (section other than the logical layer circuit included in the macrocell MC1) such as a serial interface engine (SIE) and a user logic (circuit specific to device).

The macrocell MC2 is a soft macro of which the routing and the circuit cell placement are automated, for example. In more detail, the routing between basic cells and the like are automatically performed by a gate array automatic placement and routing tool (part of the routing and placement may be fixed).

In FIG. 1, a macrocell including only the physical layer circuit may be used as the macrocell MC1. It suffices that the macrocell MC2 include at least an upper layer circuit of the physical layer.

In FIG. 1, an I/O region is provided along four sides of the integrated circuit device. A plurality of I/O cells (input cell, output cell, and input-output cell) are disposed side by side in the I/O region. A plurality of pads including pads (terminals) for differential signals DP (D+) and DM (D−) are disposed side by side outside the I/O region. In FIG. 1, the macrocell MC1 is disposed so that the entire I/O region of the macrocell MC1 overlaps a part of the I/O region of the macrocell MC2. A configuration in which the pad is provided inside the I/O region (I/O cell) may be employed.

2. Configuration of Data Transfer Control Device

Figure 2:
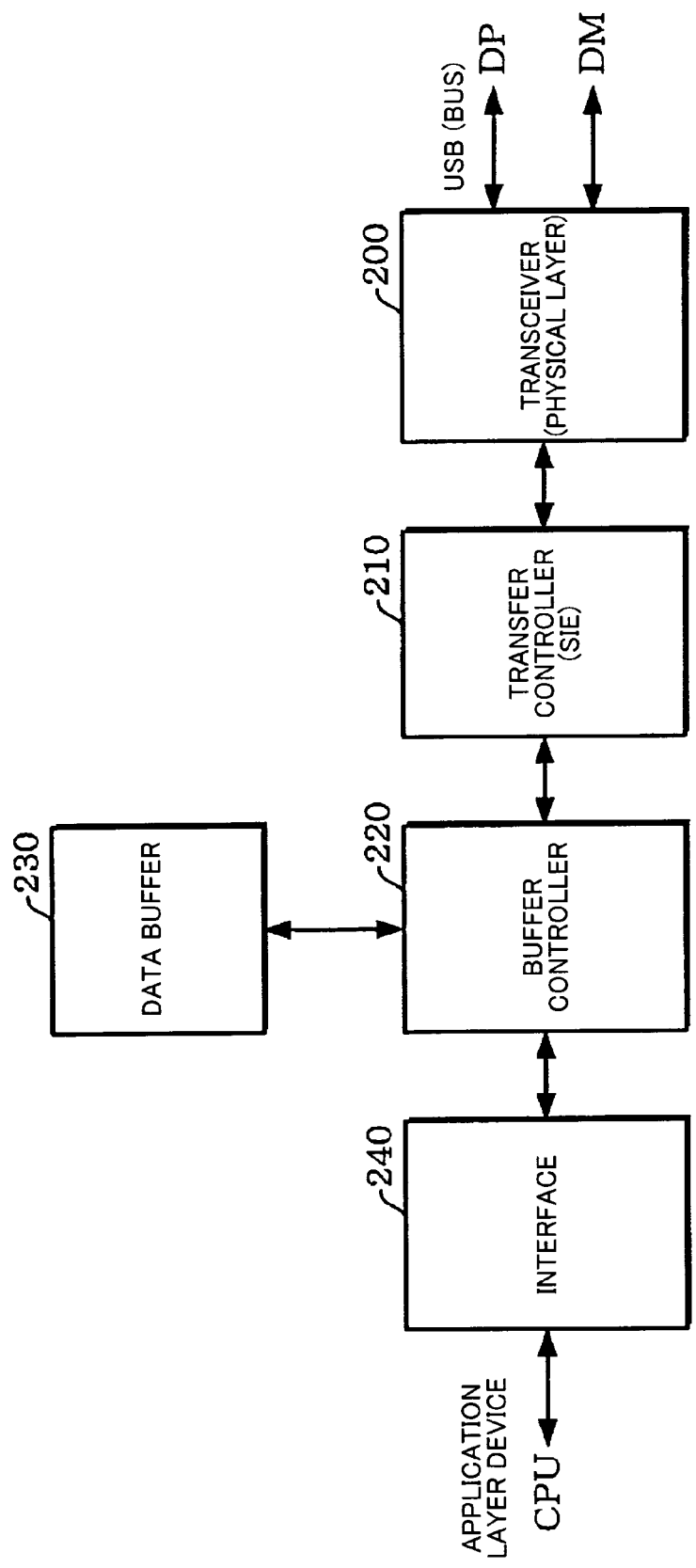
FIG. 2 shows a configuration example of a data transfer control device implemented by the integrated circuit device shown in FIG. 1.

FIG. 2 shows a data transfer control device implemented by the integrated circuit device shown in FIG. 1. The device implemented by the integrated circuit device in this embodiment is not limited to the configuration shown in FIG. 2. For example, a data transfer control device having a configuration differing from the configuration shown in FIG. 2 may be implemented. A device such as an application layer device or a CPU (processor in a broad sense) may be added to the configuration shown in FIG. 2, and may be integrated as one chip of an integrated circuit device.

The data transfer control device (integrated circuit device) shown in FIG. 2 includes a transceiver 200, a transfer controller 210, a buffer controller 220, a data buffer 230, and an interface circuit 240. Some of these circuit blocks may be omitted, or the connection configuration of the circuit blocks may be changed.

The transceiver 200 is a circuit for transmitting and receiving data using the differential signals DP and DM (differential data signals). The transceiver 200 may include a USB (given interface standard in a broad sense) physical layer circuit (analog front-end circuit), for example. A circuit in a layer other than the physical layer may be included in the transceiver 200.

The transfer controller 210 is a controller for controlling data transfer through USB, and implements the function of the serial interface engine (SIE) or the like. The transfer controller 210 performs packet handling processing, suspend & resume control, or transaction management, for example.

The buffer controller 220 allocates a storage region (endpoint region or the like) in a data buffer 230, and controls access to the storage region of the data buffer 230. In more detail, the buffer controller 220 controls access from the application layer device through the interface circuit 240, access from the CPU through the interface circuit 240, or access from USB (transfer controller 210), arbitrates these accesses, or generates and manages access addresses.

The data buffer 230 (packet buffer) is a buffer (FIFO) for temporarily storing (buffering) data (transmission data or reception data) transferred through USB. The data buffer 230 may be formed by a memory such as a RAM.

The interface circuit 240 is a circuit for implementing an interface through a direct memory access (DMA) bus to which the application layer device is connected and a CPU bus to which the CPU is connected. The interface circuit 240 may include a DMA handler circuit for DMA transfer, for example.

The macrocell MC1 shown in FIG. 1 may include at least a part of the transceiver 200 shown in FIG. 2. The macrocell MC2 may include at least a part of the transfer controller 210, the buffer controller 220, the data buffer 230, and the interface circuit 240. The macrocell MC2 may include a circuit of the application layer device or the like.

3. Configuration of Transceiver

Figure 3:
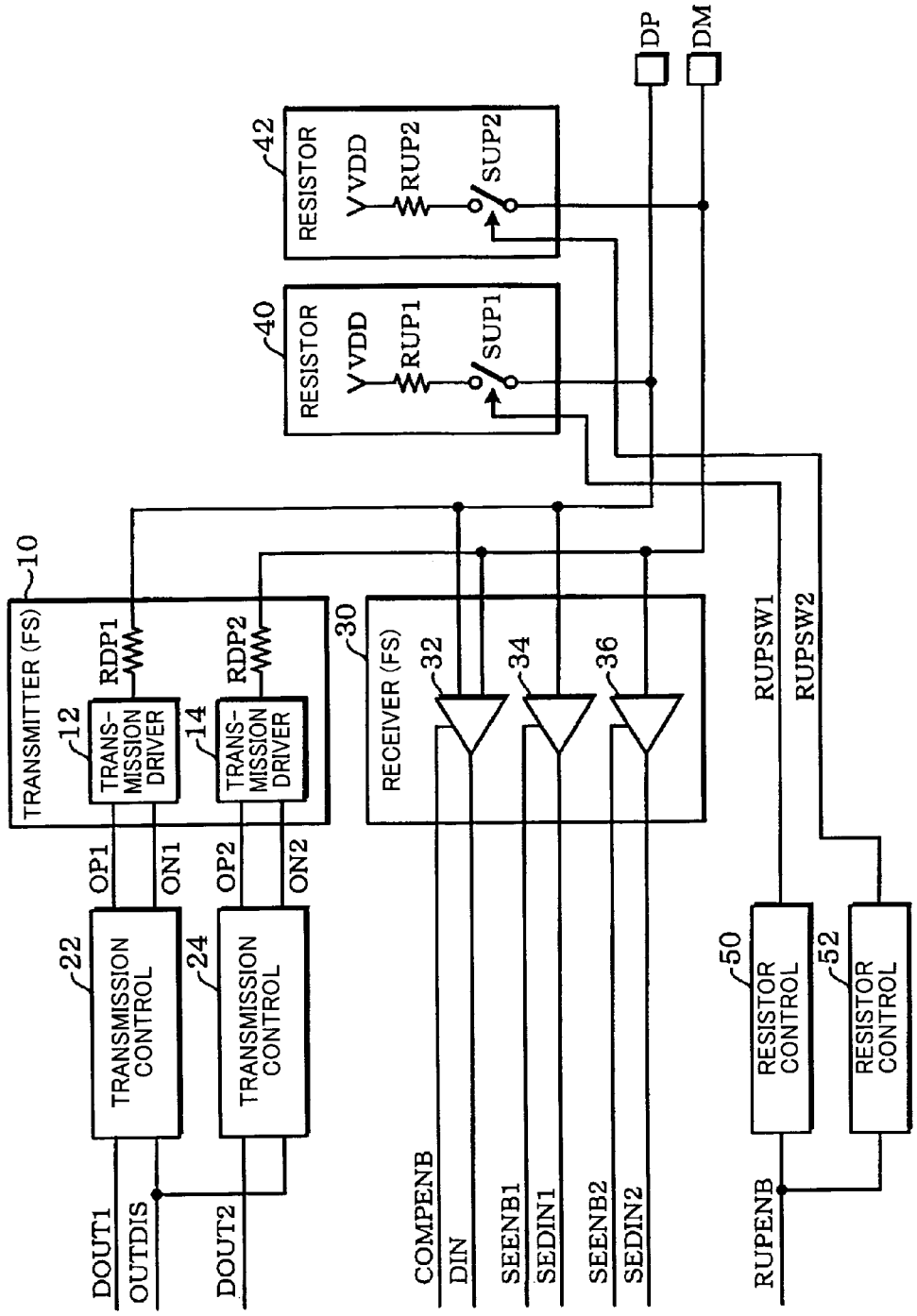
FIG. 3 shows a configuration example of a physical layer circuit shown in FIG. 2.

FIG. 3 shows a detailed configuration example of the transceiver 200 (physical layer circuit).

In FIG. 3, the transmitter circuit 10 is a circuit for performing data transmission processing using the differential signals DP and DM in the USB FS mode, for example. The transmitter circuit 10 includes a first transmission driver 12 which drives a signal line connected with the pad for the signal DP (first signal in a broad sense) which forms the differential signals, and a second transmission driver 14 which drives a signal line connected with the pad for the signal DM (second signal in a broad sense) which forms the differential signals, The differential signals can be transferred using the pads (data terminals) for the signals DP and DM by driving the signal lines connected with the pads for the signals DP and DM using the transmission drivers 12 and 14.

The transmitter circuit 10 includes a first damping resistor RDP1 and a second damping resistor RDP2 respectively connected with the pads for the signals DP and DM (first and second pad in a broad sense). One end of the damping resistors RDP1 and RDP2 is respectively connected with the outputs of the transmission drivers 12 and 14 and the other end is respectively connected with the pads for the signals DP and DM. The transmitter circuit 10 (integrated circuit device) may have a configuration in which the damping resistors RDP1 and RDP2 are omitted. In this case, the damping resistors RDP1 and RDP2 may be implemented by external parts.

First and second transmission control circuits 22 and 24 are circuits for controlling the first and second transmission drivers 12 and 14. In more detail, the transmission control circuit 22 receives a transmission data signal DOUT1 and an output disable signal OUTDIS from the circuit in the preceding stage (circuit in the macrocell MC2, for example), and outputs control signals OP1 and ON1 to the transmission driver 12. The transmission control circuit 24 receives signals DOUT2 and OUTDIS from the circuit in the preceding stage, and outputs control signals OP2 and ON2 to the transmission driver 14.

A receiver circuit 30 is a circuit for performing data reception processing using the differential signals DP and DM in the USB FS mode, for example. The receiver circuit 30 includes a differential receiver 32, and first and second single-end-receivers 34 and 36.

The differential receiver 32 (differential comparator) differentially amplifies the differential signals input through the pads for the signals DP and DM, and outputs the amplified signal to the circuit in the subsequent stage (circuit in the macrocell MC2, for example) as a data signal DIN. The differential receiver 32 may be implemented by an operational amplifier circuit to which the differential signals DP and DM are input at its first and second differential inputs. The operation of the differential receiver 32 is enabled or disabled by an enable signal COMPENB.

The single-end-receiver 34 amplifies the single end signal input through the pad for the signal DP, and outputs the amplified signal to the circuit in the subsequent stage (circuit in the macrocell MC2, for example) as a data signal SEDIN1. The single-end-receiver 36 amplifies the single end signal input through the pad for the signal DM, and outputs the amplified signal to the circuit in the subsequent stage as a data signal SEDIN2. The single-end-receivers 34 and 36 may be implemented by buffer circuits having hysteresis characteristics in which the threshold value differs between the rising time and the falling time of the input voltage, for example. The operations of the single-end-receivers 34 and 36 are enabled or disabled by enable signals SEENB1 and SEENB2.

A pull-up resistor circuit 40 is a circuit for pulling up the signal line for the signal DP, and is connected with the pad for the signal DP (first pad). The resistor circuit 40 includes a switch element SUP1 implemented by a transistor or the like, and a 1.5 Kohm pull-up resistor RUP1, for example. In more detail, one end of the switch element SUP1 is connected with the pad for the signal DP, and the other end is connected with one end of a resistor RUP1. The other end of the resistor RUP1 is connected with a power supply VDD.

A resistor circuit 42 is a dummy resistor circuit for forming a parasitic capacitance equivalent to the parasitic capacitance formed by connecting the resistor circuit 40 with the signal line for the signal DP or the like on the signal line for the signal DM, and is connected with the signal line for the signal DM. The resistor circuit 42 includes a switch element SUP2 and a resistor RUP2 respectively having the same configuration as the switch element SUP1 and the resistor RUP1 of the resistor circuit 40 (same gate length and gate width, and same resistance). In more detail, one end of the switch element SUP2 is connected with the pad for the signal DM, and the other end is connected with one end of a resistor RUP2.

In FIG. 3, the resistors RUP1 and RUP2 are provided on the side of the power supply VDD. However, the switch elements SUP1 and SUP2 may be provided on the side of the power supply VDD.

Resistor control circuits 50 and 52 are circuits for respectively controlling the resistor circuits 40 and 42. In more detail, the resistor control circuits 50 and 52 generate signals RUPSW1 and RUPSW2 which control ON/OFF of the switch elements SUP1 and SUP2, and output the signals RUPSW1 and RUPSW2 to the resistor circuits 40 and 42, respectively.

The resistor control circuit 50 outputs the signal RUPSW1 based on a pull-up enable signal RUPENB from the circuit in the subsequent stage (circuit in the macrocell MC2, for example). In more detail, the resistor control circuit 50 causes the signal RUPSW1 to become active when the signal RUPENB becomes active, thereby turning ON the switch element SUP1. The resistor control circuit 52 may always cause the signal RUPSW2 to become active independent from the voltage level for the signal RUPENB, or may cause the signal RUPSW2 to become active based on the signal RUPENB.

Figure 4:
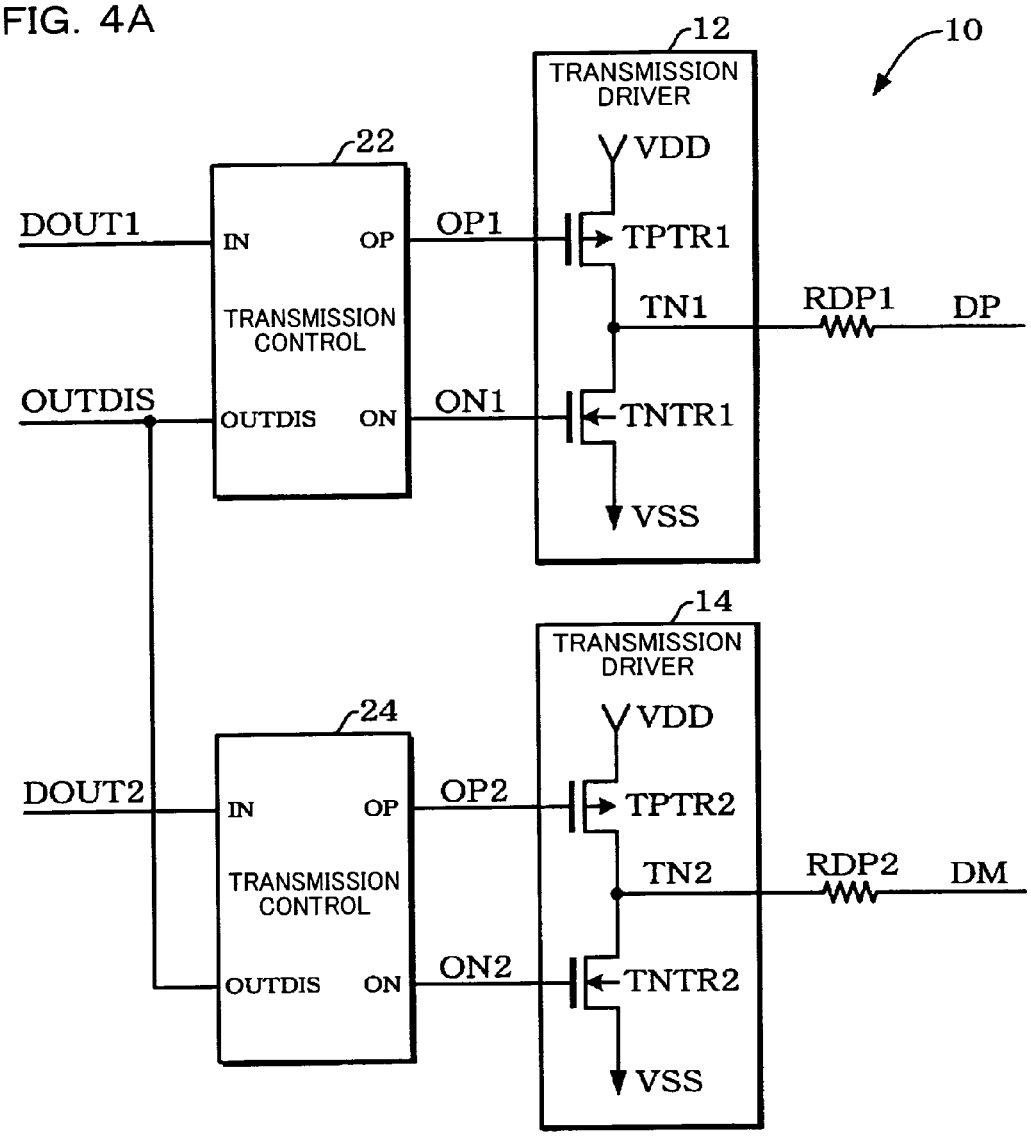
FIG. 4A shows a configuration example of a transmitter circuit.
FIG. 4B is a truth table.

FIG. 4A shows a specific circuit configuration example of the transmitter circuit 10 (for FS). The transmission driver 12 includes a P-type transistor TPTR1 and an N-type transistor TNTR1 connected in series between power supplies VDD and VSS (first and second power supplies in a broad sense). The damping resistor RDP1 is provided between an output node TN1 and a node for the signal DP. The transmission driver 14 includes a P-type transistor TPTR2 and an N-type transistor TNTR2 connected in series between the power supplies VDD and VSS. The damping resistor RDP2 is provided between an output node TN2 and a nodes for the signal DM.

The transmission control circuit 22 receives the signals DOUT1 and OUTDIS from the circuit in the preceding stage, performs a logical operation according to a truth table shown in FIG. 4B, and outputs the signals OP1 and ON1 to the transmission driver 12. The transmission control circuit 24 receives the signals DOUT2 and OUTDIS from the circuit in the preceding stage, performs a logical operation according to the truth table shown in FIG. 4B, and outputs the signals OP2 and ON2 to the transmission driver 14. Suppose that the signal OUTDIS is at the low level (L level), for example. The signal DP is set at the low level when the signal DOUT1 is at the low level, and the signal DP is set at the high level when the signal DOUT1 is at the high level (H level). The signal DM is set at the low level when the signal DOUT2 is at the low level, and the signal DM is set at the high level when the signal DOUT2 is at the high level. When the signal OUTDIS is at the high level, the signals DP and DM are set in a high impedance state.

4. Layout of Macrocell MC1

Figure 5:
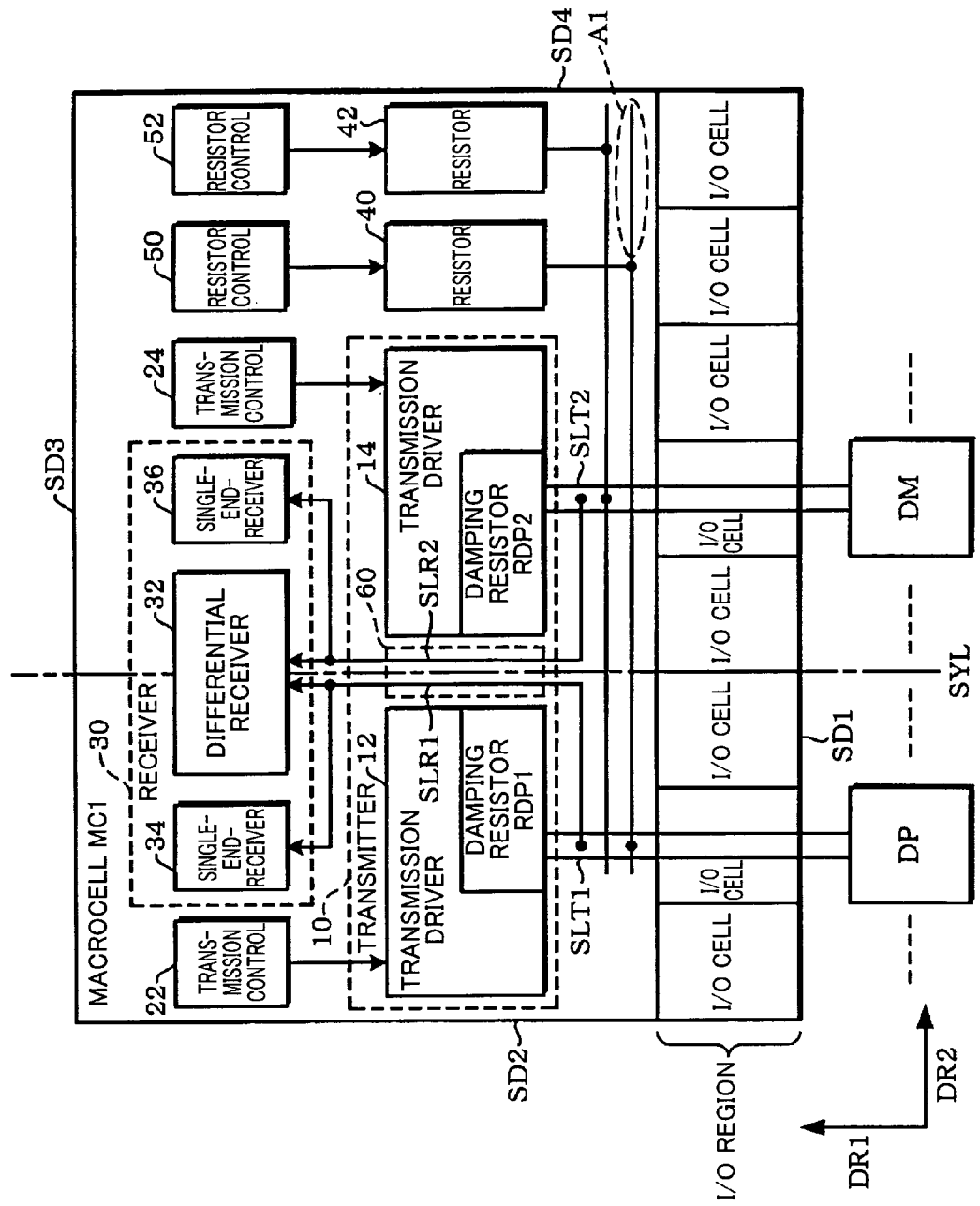
FIG. 5 shows a layout example of a macrocell MC1 according to one embodiment of the present invention.

FIG. 5 shows a layout example of the macrocell MC1 according to one embodiment of the present invention. The layout of the macrocell MC1 is not limited to the example shown in FIG. 5. It is possible to make various modifications.

The macrocell MC1 shown in FIG. 5 includes an I/O region in which a plurality of (N) I/O cells are disposed. The I/O cells are disposed side by side in the longitudinal direction of the I/O region. A plurality of pads including the pads for the signals DP and DM are disposed outside the I/O region. The macrocell MC1 may have a configuration in which the I/O region includes the pad.

The direction from a first side SD1 of the macrocell MC1 to a third side SD3 opposite to the first side SD1 is defined as a first direction DR1. The transmission drivers 12 and 14 included in the transmitter circuit 10 are disposed on the first direction DR1 side of the pads for the signals DP and DM (I/O region). In more detail, the transmission drivers 12 and 14 are disposed to be adjacent to the I/O region.

A line along the first direction DR1 is defined as a first line SYL. The transmission drivers 12 and 14 are line-symmetrically disposed on opposite sides of the line SYL as the symmetry axis (including the case where the transmission drivers 12 and 14 are substantially line-symmetrical). In the case where the transmitter circuit 10 (integrated circuit device) includes the damping resistors RDP1 and RDP2, the damping resistors RDP1 and RDP2 are line-symmetrically disposed on opposite sides of the line SYL as the symmetry axis. The pads for the signals DP and DM may be line-symmetrically disposed on opposite sides of the line SYL as the symmetry axis.

In this embodiment, the receiver circuit 30 is disposed on the first direction DR1 side of the transmitter circuit 10 (transmission drivers 12 and 14). In more detail, the receiver circuit 30 is disposed to be adjacent to the transmitter circuit 10 the side of the first direction DR1. The receiver circuit 30 includes the differential receiver 32 and the single-end-receivers 34 and 36. The macrocell MC1 may have a configuration in which the receiver circuit 30 is not disposed in the first direction DR1 from the transmitter circuit 10. When the direction opposite to the first direction DR1 is defined as a third direction DR3, the macrocell MC1 may be configured so that the receiver circuit 30 is disposed on the third direction DR3 side of the transmitter circuit 10 (side of the pads for the signals DP and DM), or may be configured so that the receiver circuit 30 is disposed in the region between the transmission drivers 12 and 14.

In this embodiment, the transmission control circuits 22 and 24 for controlling the transmission drivers 12 and 14 are also disposed on the first direction DR1 side of the transmitter circuit 10. In more detail, the transmission control circuits 22 and 24 are disposed to be adjacent to the transmitter circuit 10 on the side of the first direction DR1. The receiver circuit 30 is disposed in the region between the transmission control circuits 22 and 24.

Another circuit block (level shifter which converts a signal level, for example) may be disposed in the region between the transmission control circuit 22 and the receiver circuit 30 or the region between the transmission control circuit 24 and the receiver circuit 30. Another circuit block may be disposed in the region between the transmitter circuit 10 and the receiver circuit 30 or the transmission control circuits 22 and 24.

In this embodiment, a routing region 60 (an interconnect region) for routing the signal lines which connect the receiver circuit 30 with the pads for the signals DP and DM (first and second pads) is provided in the region between the transmission driver 12 and the transmission driver 14. A configuration may be employed in which the routing region 60 is disposed at another location (left of the transmission driver 12 or right of the transmission driver 14, for example).

The direction from a second side SD2 of the macrocell MC1 to a fourth side SD4 opposite to the second side SD2 is defined as a second direction DR2. In this embodiment, the pull-up (or pull-down) resistor circuit 40 and the dummy resistor circuit 42 are disposed on the second direction DR2 side of the transmitter circuit 10 (transmission drivers 12 and 14). The resistor control circuits 50 and 52 are disposed on the first direction DR1 side of the resistor circuits 40 and 42.

In FIG. 5, the left side of the macrocell MC1 is the second side SD2 and the right side is the fourth side SD4. However, the left side may be the fourth side SD4 and the right side may be the second side SD2. In this case, the resistor circuits 40 and 42 are disposed on the left of the transmitter circuit 10. Another circuit block may be disposed in the region between the transmitter circuit 10 and the resistor circuits 40 and 42 or the region between the resistor circuits 40 and 42 and the resistor control circuits 50 and 52. The resistor circuit 40 (and the resistor control circuit 50) and the resistor circuit 42 (and the resistor control circuit 52) may be line-symmetrically disposed on opposite sides of the first line SYL as the symmetry axis. A configuration may be employed in which the receiver circuit 30 is not disposed on the first direction DR1 side of the transmitter circuit 10 (the receiver circuit 30 is disposed on the third direction DR3 side of the transmitter circuit 10 or in the region 60, for example) and the resistor circuits 40 and 42 are disposed on the second direction DR2 side of the transmitter circuit 10.

An FS mode physical layer circuit has been conventionally placed by the automatic placement/routing technique such as the gate array (sea of gate). Therefore, the circuit cells which form the transmitter circuit 10 and the receiver circuit 30 are disposed at various locations in the integrated circuit device, and the placement positions are changed corresponding to the type of integrated circuit device. As a result, a problem occurs in which the signal characteristics of the differential signals DP and DM change corresponding to the type of integrated circuit device, whereby the signal characteristics of the differential signals DP and DM must be reevaluated each time a new integrated circuit device is manufactured.

In this embodiment, as shown in FIG. 5, the physical layer circuits such as the transmitter circuit 10 and the receiver circuit 30 are macrocelled as a hard macro in which the routing and the circuit cell placement are fixed. Therefore, a problem in which the placement positions of the circuit cells which form the transmitter circuit 10 and the receiver circuit 30 are dispersed in the integrated circuit device can be prevented, whereby the signal characteristics of the differential signals DP and DM can be uniformly maintained among various types of integrated circuit device. As a result, it is unnecessary to reevaluate the signal characteristics of the differential signals DP and DM when manufacturing a new integrated circuit device as an ASIC, whereby a reduction of development cost and development period can be achieved.

In the method of implementing the damping resistors RDP1 and RDP2 and the pull-up resistor RUP1 in the resistor circuit 40 using external parts of the integrated circuit device, since various types of resistors may be used by the user, it is difficult to guarantee the signal characteristics of the differential signals DP and DM. In this embodiment, the damping resistors RDP1 and RDP2 and the pull-up resistor RUP1 are included in the macrocell MC1 as on-chip resistors. Therefore, it is easy to guarantee the signal characteristics of the differential signals DP and DM in comparison with the method of implementing the resistors using external parts of the integrated circuit device.

The damping resistors RDP1 and RDP2 may be implemented by diffused resistors formed by diffusion regions into which an impurity at a predetermined polarity is introduced, for example. This enables a parasitic diode formed between the diffusion region which forms the diffused resistor and a substrate to be used as an electrostatic protection circuit for the signal lines for the differential signals DP and DM, whereby reliability of the integrated circuit device can be improved. Specifically, it is possible to guarantee the signal characteristics of the differential signals DP and DM and to improve reliability of the integrated circuit device by providing the damping resistors RDP1 and RDP2 formed by the diffused resistors in the integrated circuit device.

In this embodiment, the transmission drivers 12 and 14 are line-symmetrically disposed on opposite sides of the line SYL as the symmetry axis. Therefore, the signal lines from the pads for the signals DP and DM can be line-symmetrically disposed on opposite sides of the line SYL as the symmetry axis, whereby the interconnect lengths of these signal lines can be made equal. As a result, the parasitic capacitance and the parasitic resistance of the signal line for the signal DP can be made equal to the parasitic capacitance and the parasitic resistance of the signal line for the signal DM (including the case where the parasitic capacitances and the parasitic resistances are substantially equal), whereby the signal characteristics for the signals DP and DM can be improved.

Figure 6A:
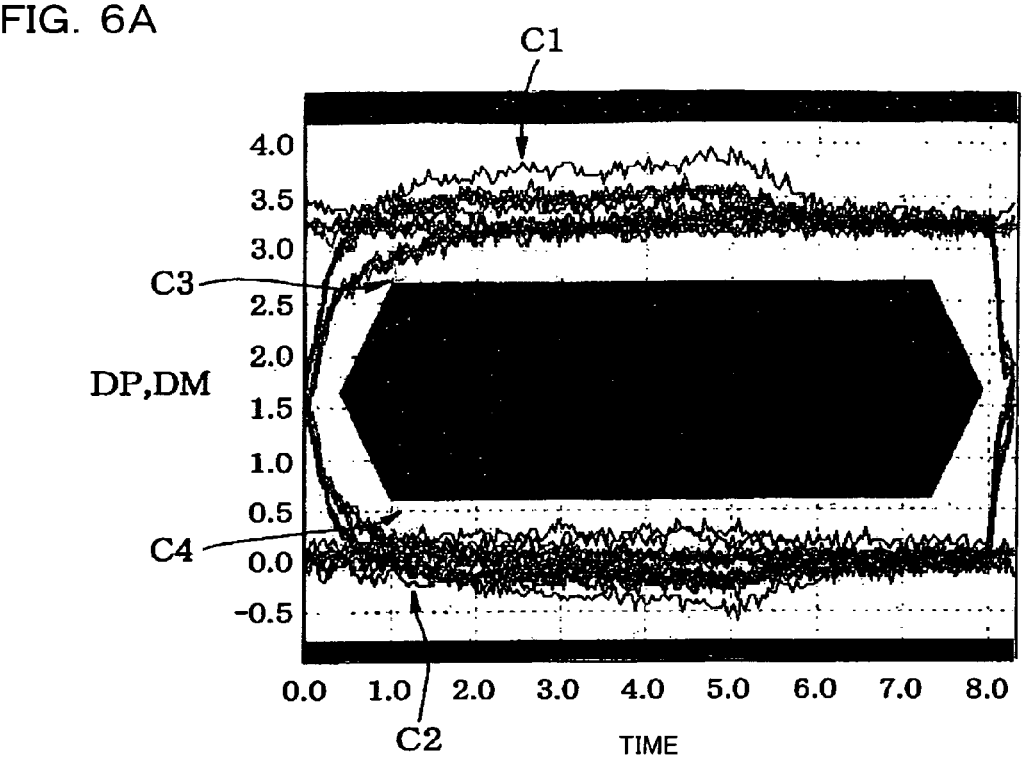
FIGS. 6A and 6B show signal characteristics of differential signals DP and DM.

FIG. 6A shows the signal characteristics (eye pattern) for the signals DP and DM when the transmitter circuit 10 and the receiver circuit 30 are placed by the automatic placement/routing technique such as the gate array. In FIG. 6A, since the symmetry for the signal waveforms for the signals DP and DM cannot be maintained as indicated by C1 and C2, the cross point for the signals shifts from an ideal value (1.65 V which is half of the full swing voltage 3.3 V, for example). As a result, the space between the signal waveforms for the signals DP and DM and the forbidden region (hexagonal region) is decreased as indicated by C3 and C4, whereby excellent signal characteristics cannot be obtained.

Figure 6B:
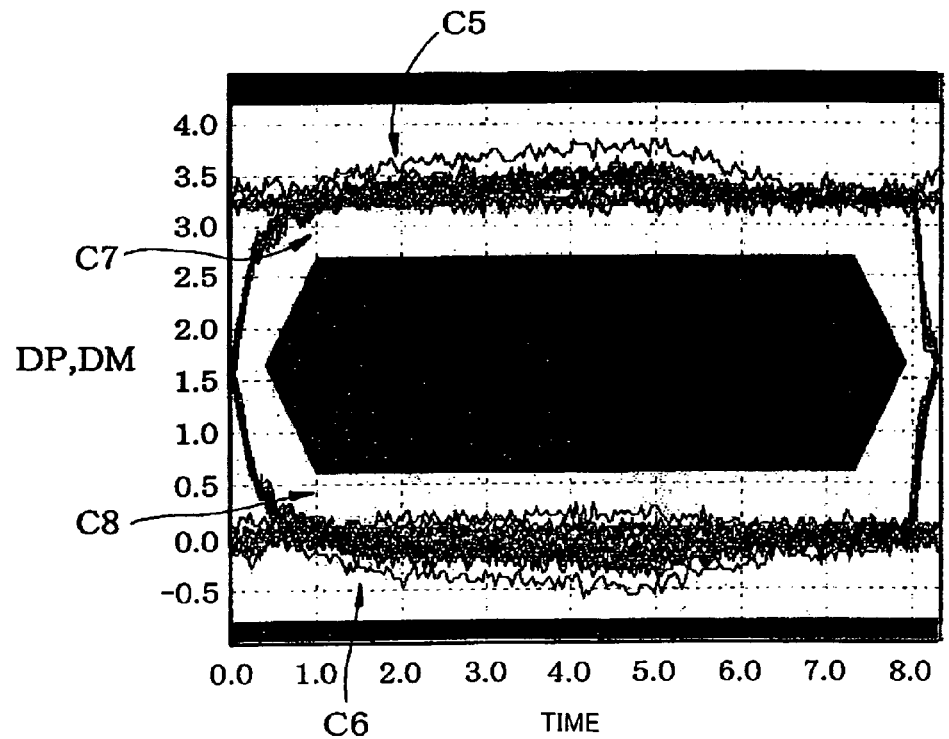

FIG. 6B shows the signal characteristics for the signals DP and DM when the transmitter circuit 10 and the receiver circuit 30 are positioned by the method in this embodiment. In FIG. 6B, since the symmetry for the signal waveforms for the signals DP and DM are maintained as indicated by C5 and C6, the cross point for the signals can be close to the ideal value. As a result, the space between the signal waveforms for the signals DP and DM and the forbidden region is increased as indicated by C7 and C8, whereby excellent signal characteristics can be obtained.

In this embodiment, since the transmitter circuit 10 is disposed on the first direction DR1 side of the pads for the signals DP and DM and the receiver circuit 30 is disposed on the first direction DR1 side of the transmitter circuit 10, the layout area of the macrocell MC1 can be significantly reduced.

Specifically, since the transmission drivers 12 and 14 in the transmitter circuit 10 must drive the USB DP and DM lines, the transmission drivers 12 and 14 must have a predetermined current drive capability (18 mA, for example). Therefore, if the line widths for the signal lines SLT1 and SLT2 which connect the pads for the signals DP and DM and the transmitter circuit 10 are small, the signal line may be cut by electromigration. Therefore, it is preferable to increase the line widths for the signal lines SLT1 and SLT2.

In the receiver circuit 30, the signals DP and DM are input to gates of CMOS transistors which form the receiver circuit 30. Therefore, the line widths for the signal lines SLR1 and SLR2 in the routing region 60 which connect the pads for the signals DP and DM and the receiver circuit 30 can be reduced in comparison with the signal lines SLT1 and SLT2 connected with the transmitter circuit 10. Specifically, the line widths can be reduced to the minimum line width in the design rule, for example.

Therefore, if the transmitter circuit 10 is disposed on the first direction DR1 side of the receiver circuit 30 differing from FIG. 5, for example, a routing region for connecting the thick signal lines SLT1 and SLT2 with the transmitter circuit 10 is necessary. Therefore, since the width of the macrocell MC1 (length of the first side SD1) is increased due to the thick signal lines SLT1 and SLT2, the circuit area of the integrated circuit device is increased, whereby cost of the product is increased.

In this embodiment, the receiver circuit 30 is disposed on the first direction DR1 side of the transmitter circuit 10, as shown in FIG. 5. Therefore, it suffices to route the thick signal lines SLT1 and SLT2 only to the transmitter circuit 10 disposed closer to the pads for the signals DP and DM. As a result, a problem in which the width of the macrocell MC1 is increased due to the routing region of the thick signal lines SLT1 and SLT2 can be prevented. The line widths for the signal lines SLR1 and SLR2 routed in the routing region 60 provided between the transmission drivers 12 and 14 can be reduced. Therefore, since the width of the routing region 60 is reduced, the width of the macrocell MC1 is not increased to a great extent even if the routing region 60 is provided between the transmission drivers 12 and 14. As a result, the circuit area of the integrated circuit device can be reduced, whereby a reduction of cost of the product can be implemented.

Since a large current supply capability is required for the transmission drivers 12 and 14, it is necessary to increase the size (W/L) of the transistors (TPTR1, TNTR1, TPTR2, and TNTR2 shown in FIG. 4A) which form the transmission drivers 12 and 14. Therefore, the layout area of the transmitter circuit 10 including the transmission drivers 12 and 14 is increased in comparison with the layout area of the receiver circuit 30, as shown in FIG. 5. Therefore, according to the method of positioning the receiver circuit 30 on the first direction DR1 side of the transmitter circuit 10 as shown in FIG. 5, free spaces can be formed on opposite sides of the receiver circuit 30. The free spaces can be effectively used by placing the transmission control circuits 22 and 24 in the free spaces on opposite sides of the receiver circuit 30, whereby the layout efficiency can be increased.

In FIG. 5, the resistor circuits 40 and 42 (and the resistor control circuits 50 and 52) are not line-symmetrically disposed on opposite sides of the first line SYL as the symmetry axis. It is preferable to line-symmetrically dispose the resistor circuits 40 and 42 on opposite sides of the first line SYL in order to equalize the parasitic resistances and the parasitic capacitances for the signal lines for the signals DP and DM. However, the distance between the resistor circuits 40 and 42 is increased by line-symmetrically disposing the resistor circuits 40 and 42. This may cause the resistance and the parasitic capacitance of the resistor circuit 40 to differ from the resistance and the parasitic capacitance of the resistor circuit 42 due to variation in the manufacturing process, whereby the signal characteristics for the signals DP and DM may deteriorate.

In FIG. 5, the resistor circuits 40 and 42 are not line-symmetrically disposed and are disposed on the second direction DR2 side of the transmitter circuit 10. Therefore, since the resistor circuits 40 and 42 are disposed closer together, the resistance and the parasitic capacitance of the resistor circuit 40 can be made approximately equal to the resistance and the parasitic capacitance of the resistor circuit 42 even if the manufacturing process varies. If a dummy interconnect which is originally unnecessary is provided as indicated by A1 in FIG. 5, the interconnect lengths for the signals DP and DM can be made equal even if the resistor circuits 40 and 42 are not line-symmetrically disposed. As a result, a problem in which the signal characteristics for the signals DP and DM deteriorate can be prevented.

5. Shield Line

Figure 7:
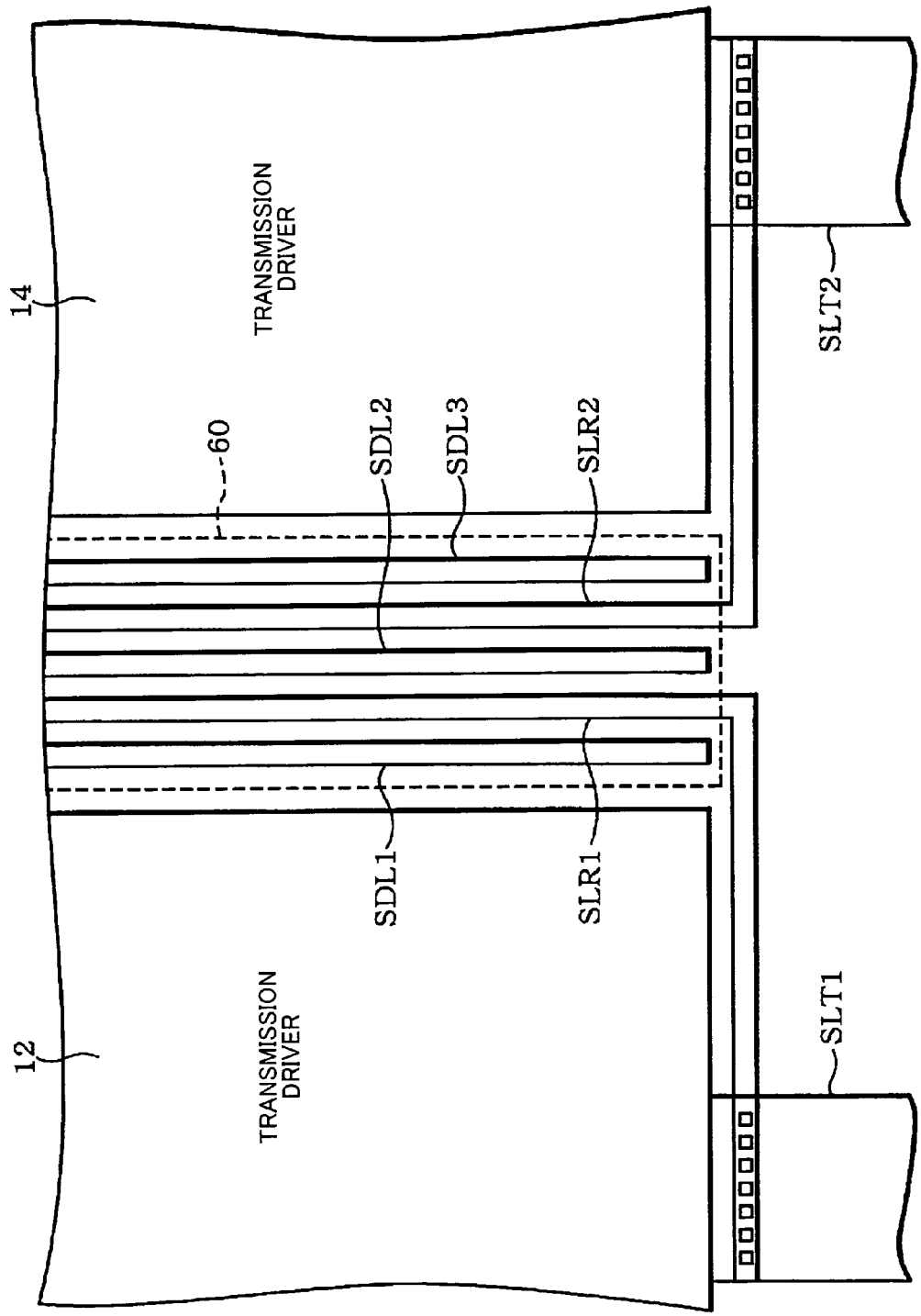
FIG. 7 is illustrative of a method in which a shield line is provided in a routing region of differential signals DP and DM.

As shown in FIG. 7, in this embodiment, the line widths for the signal lines SLR1 and SLR2 are reduced in comparison with the signal lines SLT1 and SLT2, and the signal lines SLR1 and SLR2 are routed in the routing region 60 between the transmission drivers 12 and 14. This enables the width of the routing region 60 to be reduced since the line widths for the signal lines SLR1 and SLR2 can be reduced, whereby the layout area of the macrocell MC1 can be reduced.

However, the signal characteristics for the signals DP and DM deteriorate when signal noise from another circuit such as the transmission drivers 12 and 14 is superimposed on the signal lines SLR1 and SLR2 for the signals DP and DM.

In FIG. 7, shield lines SDL1, SDL2, and SDL3 are routed in the routing region 60 along the signal line SLR1 and SLR2. The shield lines SDL1 to SDL3 are connected with nodes of predetermined power supplies (VSS and GND), for example. In FIG. 7, three shield lines are routed. However, the number of shield lines is arbitrary, and may be one or two.

The width of the routing region 60 may be increased by routing the shield lines SDL1 to SDL3, whereby the layout area may be increased. However, the line widths of the shield lines SDL1 to SDL3 can be reduced in the same manner as the signal lines SLR1 and SLR2. Therefore, the width of the routing region 60 is not increased to a large extent even if the shield lines SDL1 to SDL3 are routed, whereby the layout area is not increased to a large extent.

6. Placement of Macrocell MC1

Figure 8A:
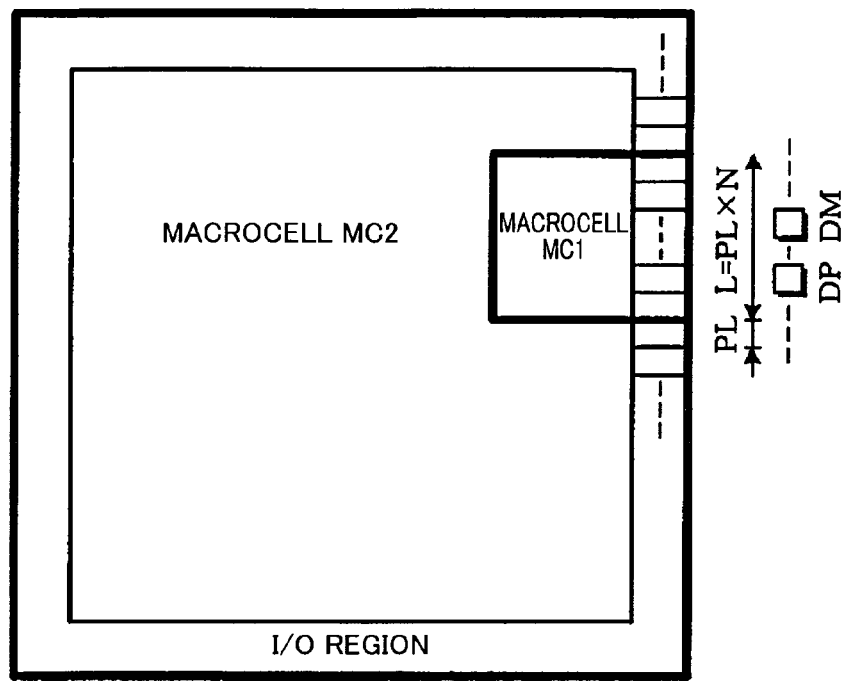
FIGS. 8A and 8B show placement examples of the macrocell MC1.

As shown in FIGS. 1 and 8A, the macrocell MC1 can be disposed at an arbitrary location (arbitrary location on arbitrary side) of the integrated circuit device by using the macrocell MC1 in this embodiment.

The user of the integrated circuit device demand that the macrocell MC1 be disposed on the right side of the integrated circuit device as shown in FIG. 8A instead of disposing the macrocell MC1 on the lower side of the integrated circuit device as shown in FIG. 1. In order to deal with such a demand, it is preferable that the macrocell MC1 be disposed on an arbitrary side of the integrated circuit device. If the pads for the signals DP and DM are disposed at the corner, bonding wires for the signals DP and DM cannot be routed or the lengths of the bonding wires for the signals DP and DM differ, whereby the load balance between the signals DP and DM may be impaired. Therefore, it is preferable that the macrocell MC1 be disposed at an arbitrary location on an arbitrary side of the integrated circuit device.

In this embodiment, the macrocell MC2 is a macrocell of which the routing and the circuit cell placement are automatically performed. The I/O region in which the I/O cells are disposed side by side is provided on the inner circumference of four sides of the macrocell MC2, as shown in FIG. 8A. The macrocell MC1 is disposed so that the entire I/O region of the macrocell MC1 overlaps a part of the I/O region of the macrocell MC2. Specifically, the macrocell MC1 is disposed so that the upper and lower lines of the I/O region of the macrocell MC1 which extend in the longitudinal direction coincide with the upper and lower lines of the I/O region of the macrocell MC2 which extend in the longitudinal direction.

When the length of the first side SD1 of the macrocell MC1 is denoted by L and the pitch of the I/O cells disposed in the I/O region of the macrocell MC2 is denoted by PL, the relationship expressed by L=PL×N (N is an integer larger than one) is satisfied.

This enables the macrocell MC1 to be disposed at an arbitrary location on an arbitrary side of the integrated circuit device (macrocell MC2). Since the macrocell MC1 is a macrocell of which the routing and the circuit cell placement are fixed, the signal characteristics for the signals DP and DM can maintained constant even if the macrocell MC1 is disposed at an arbitrary location, whereby it is unnecessary to revaluate the signal characteristics.

Figure 8B:
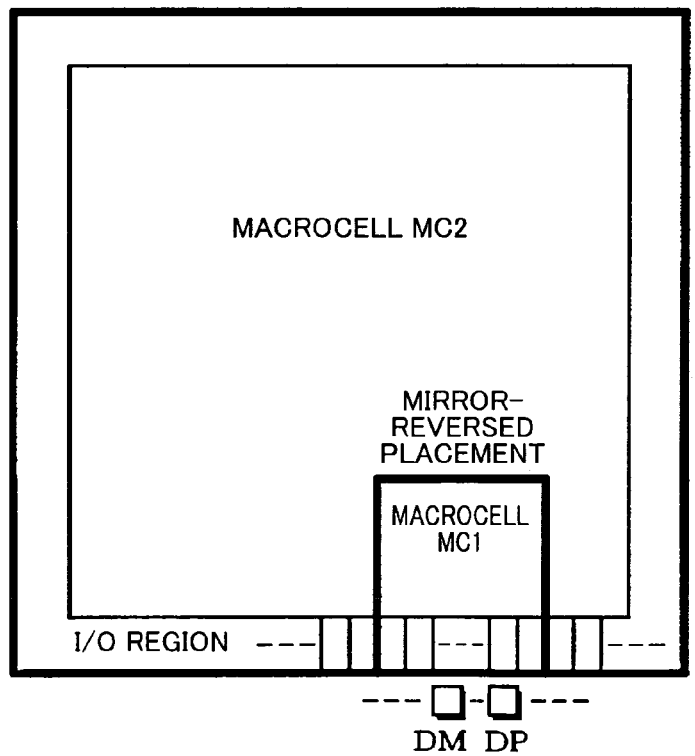

In particular, if the transmission drivers 12 and 14 and the like are line-symmetrically disposed as shown in FIG. 5, a mirror-reversed placement of the macrocell MC1 as shown in FIG. 8B can be achieved. Specifically, a user may demand that the placement order of the pads for the signals DP and DM be the reverse of the placement order shown in FIG. 1. In this case, it is possible to deal with such a demand by the user by mirror-reversing the macrocell MC1 (mask data of the macrocell MC1) using a layout CAD tool or the like. Even if such a mirror-reversal placement is achieved, since the transmission drivers 12 and 14 of the macrocell MC1 and the like are line-symmetrically disposed, the signal characteristics for the signals DP and DM can be maintained, thereby making it unnecessary to revaluate the signal characteristics.

7. Interface Region

Figure 9:
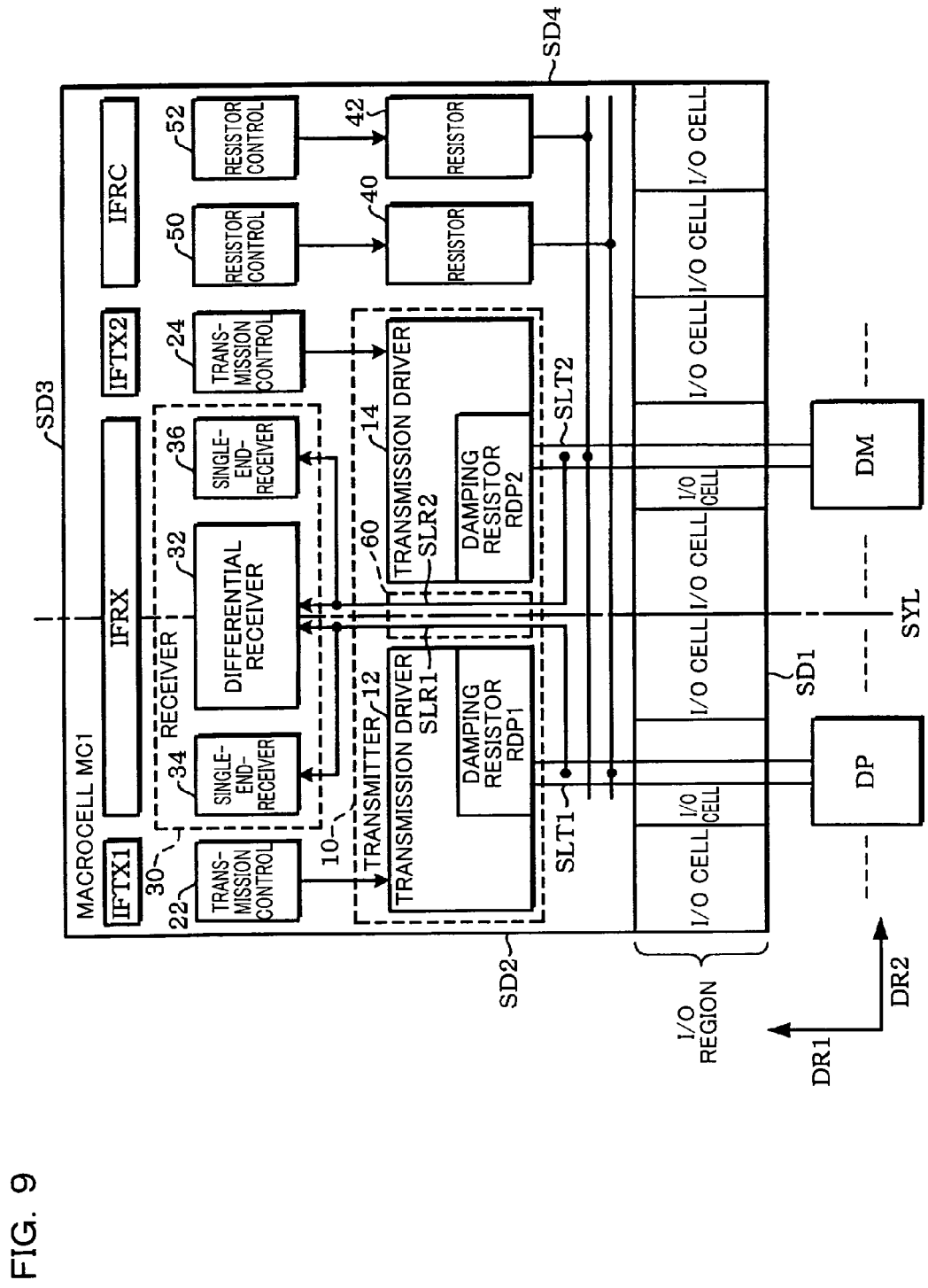
FIG. 9 shows a layout example of the macrocell MC1 for describing an interface region.

FIG. 9 shows a placement example of interface regions IFRX, IFTX1, IFTX2, and IFRC for exchanging signals between the macrocells MC1 and MC2. The interface regions IFRX, IFTX1, IFTX2, and IFRC are regions including a buffer which buffers a signal from the macrocell MC1 and outputs the signal to the macrocell MC2, a buffer which buffers a signal from the macrocell MC2 and outputs the signal to the macrocell MC1, and the like.

For example, the reception interface region IFRX is a region for interfacing signals between the receiver circuit 30 and the macrocell MC2. The reception interface region IFRX may include a buffer which buffers the signals COMPENB, DIN, SEENB1, SEDIN1, SEENB2, and SEDIN2 shown in FIG. 3 and outputs the signals to the macrocell MC2, for example.

The transmission interface regions IFTX1 and IFTX2 are regions for interfacing signals between the transmission control circuits 22 and 24 and the macrocells MC2. The transmission interface regions IFTX1 and IFTX2 may include a buffer which buffers the signals DOUT1, DOUT2, and OUTDIS shown in FIG. 3 and outputs the signals to the macrocell MC1, for example.

The resistor control interface region IFRC is a region for interfacing signals between the resistor control circuits 50 and 52 and the macrocell MC2. The resistor control interface region IFRC may include a buffer which buffers the signal RUPENB shown in FIG. 3 and outputs the signal to the macrocell MC1, for example.

In this embodiment, the interface regions IFRX, IFTX1, IFTX2, and IFRC are provided along the third side of the macrocell MC1, for example. In more detail, the interface regions IFRX, IFTX1, IFTX2, and IFRC are fixed along the third side of the macrocell MC1. This enables the delay and delivery timing of signals exchanged between the macrocells MC1 and MC2 to be easily set within the allowable range, whereby a stable circuit operation can be ensured even if the circuit configuration and the scale of the macrocell MC2 are changed.

Specifically, if the locations of the interface regions IFRX, IFTX1, IFTX2, and IFRC are fixed, the parasitic capacitance for the signal line between the macrocells MC1 and MC2 can be easily estimated. Therefore, automatic placement and routing of the macrocell MC2 which is a soft macro can be performed by setting the parasitic capacitance for the signal line within the allowable range, whereby the signal timing design can be facilitated. Moreover, the setting of the routing condition of the automatic placement and routing of the macrocell MC2 is facilitated, whereby the routing efficiency of the automatic placement and routing of the macrocell MC2 can be improved.

8. On-The-Go (OTG)

The USB standard is a standard for transferring data between a host such as a personal computer and a peripheral. The host has the initiative of data transfer control. If electronic instruments such as portable instruments, which are peripherals in the USB standard, can perform data transfer according to the USB standard without the host, convenience to the user is improved.

In view of such a situation, the OTG standard has been provided as a supplemental standard to the USB 2.0 standard. In the OTG standard, a standard relating to a dual-role device which provides a peripheral with the host function is additionally provided.

When performing data transfer according to the OTG standard, a host and a peripheral are connected through a USB cable to which a Mini-A plug and a Mini-B plug are provided on opposite ends. The Mini-A plug has a structure which allows insertion into a Mini-A receptacle and a Mini-AB receptacle. The Mini-B plug has a structure which allows insertion into a Mini-B receptacle and the Mini-AB receptacle. A dual-role device must be equipped with the Mini-AB receptacle.

Figure 10:
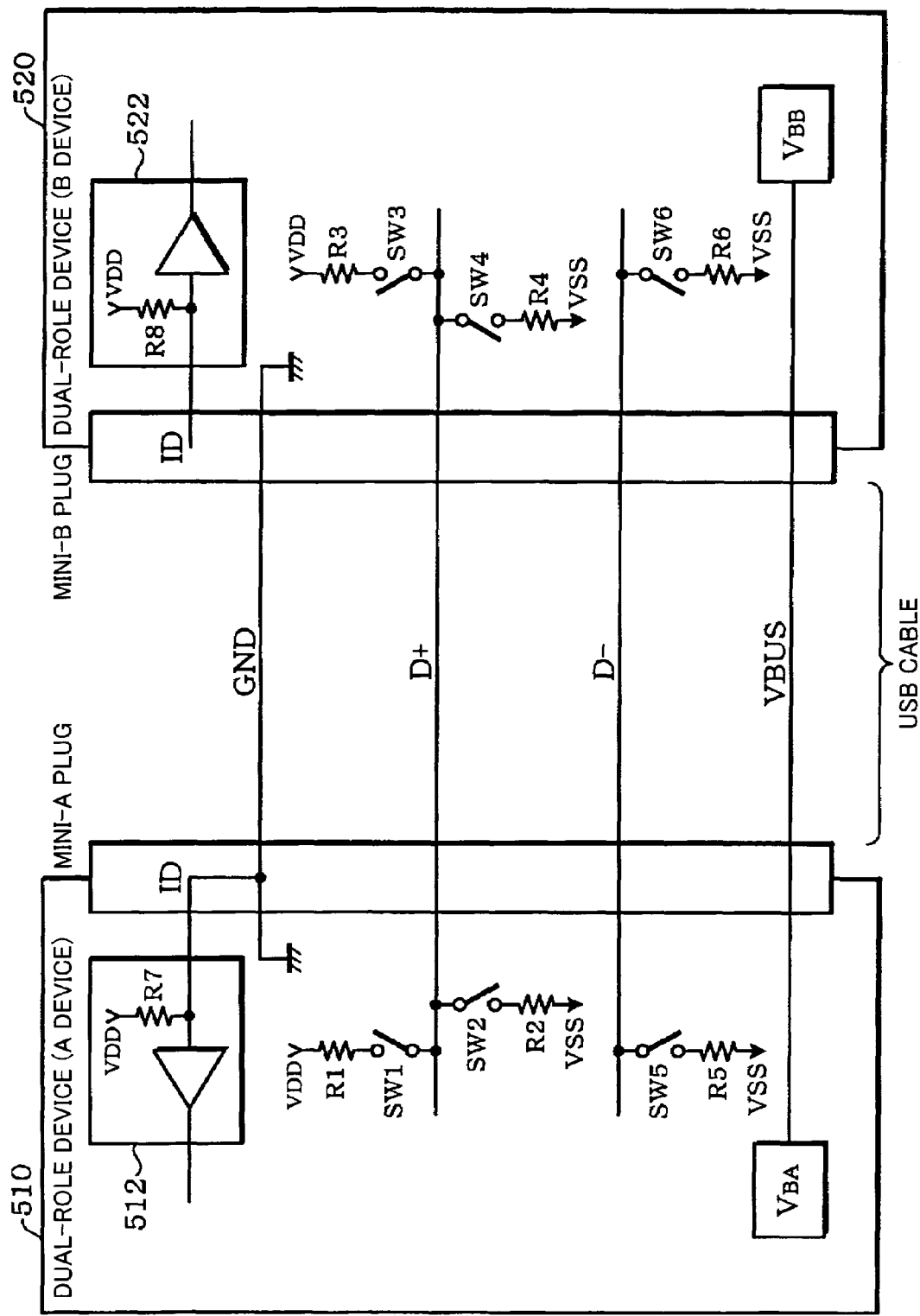
FIG. 10 is illustrative of USB OTG.

As shown in FIG. 10, a dual-role device 510 to which the Mini-A plug is connected functions as the A-device. The A-device operates as the host when a session is initiated. The A-device can transfer the host function to the B-device according to the host negotiation protocol (HNP).

A dual-role device 520 to which the Mini-B plug is connected functions as the B-device. The B-device operates as the peripheral when a session is initiated. When the host function is transferred to the B-device from the A-device according to HNP, the B-device operates as the host.

In OTG, in order to distinguish the type of the plug inserted into the Mini-AB receptacle, an ID pin as shown in FIG. 10 is defined in addition to connector terminals (VBUS, DP, DM, and GND). The ID pin is connected with GND in the Mini-A plug, and the ID pin is in an open state in the Mini-B plug.

In FIG. 10, the Mini-A plug of the USB cable is connected with the dual-role device 510, and the Mini-B plug is connected with the dual-role device 520. Therefore, the dual-role devices 510 and 520 respectively function as the A-device and the B-device. The dual-role devices 510 and 520 respectively include ID detection circuits 512 and 522. The ID detection circuits 512 and 522 respectively pull up a signal line electrically connected with the ID pin using resistors R7 and R8, and detect whether or not the ID pin is grounded corresponding to the voltage for the signal line. In FIG. 10, the ID detection circuit 512 detects that the Mini-A plug is connected since the signal line connected with the ID pin is grounded. The ID detection circuit 522 detects that the Mini-B plug is connected since the signal line connected with the ID pin is pulled up.

The dual-role device 510 includes a pull-up resistor RI and a switch element SW1 for pulling up the signal line for the signal DP, and a pull-down resistor R2 and a switch element SW2 for pulling down the signal line for the signal DP. The switch elements SW1 and SW2 are exclusively controlled so that one of the switch elements is turned OFF when the other is turned ON.

The dual-rote device 520 includes a pull-up resistor R3 and a switch element SW3 for pulling up the signal line for the signal DP, and a pull-down resistor R4 and a switch element SW4 for pulling down the signal line for the signal DP. The switch elements SW3 and SW4 are exclusively controlled so that one of the switch elements is turned OFF when the other is turned ON.

The signal line for the signal DM is pulled down by a resistor RS, a switch element SW5, a resistor R6, and a switch element SW6. Since the dual-role devices 510 and 520 can function as the A-device, the dual-role devices 510 and 520 respectively include power supply control circuits VBA and VBB which supply current to a VBUS line.

In OTG, the A-device can suspend supply of current to the VBUS line when there is no bus activity. Therefore, unnecessary power consumption can be reduced even if a battery-powered portable instrument or the like operates as the host, whereby power consumption can be reduced. When the B-device starts a session and transfers data in this state, the B-device can request the A-device to supply current to the VBUS line according to a procedure called a session request protocol (SRP). The session used herein refers to a period in which the voltage of the VBUS line exceeds a given threshold voltage.

In OTG, the dual-role device becomes either the A-device or the B-device depending on the plug connected thereto. However, the host function and the peripheral function can be exchanged without plugging or unplugging. In OTG, the host negotiation protocol (HNP) is defined as a procedure for exchanging the host function and the peripheral function.

In the FS mode, the signal line for the signal DP is pulled down on the host side, and the signal line for the signal DP is pulled up on the peripheral side, for example. When a session is initiated, the A-device operates as the host and the B-device operates as the peripheral. Therefore, the switch elements SW1 and SW2 on the A-device (510) side are respectively turned OFF and ON and the switch elements SW3 and SW4 on the B-device (520) side are respectively turned ON and OFF when a session is initiated.

The A-device causes the line state to be in the idle state when the A-device finishes using the bus. In the FS mode, the idle state is a J state. When the B-device detects the J state, the B-device disables the pull-up for the signal line for the signal DP by turning OFF the switch element SW3 to set the line state in an SE0 state. When the A-device detects the SE0 state, the A-device enables the pull-up for the signal line for the signal by turning ON the switch element SW1. This causes the line state to be in the J state, whereby the A-device starts to operate as the peripheral and the B-device starts to operate as the host.

Figure 11:
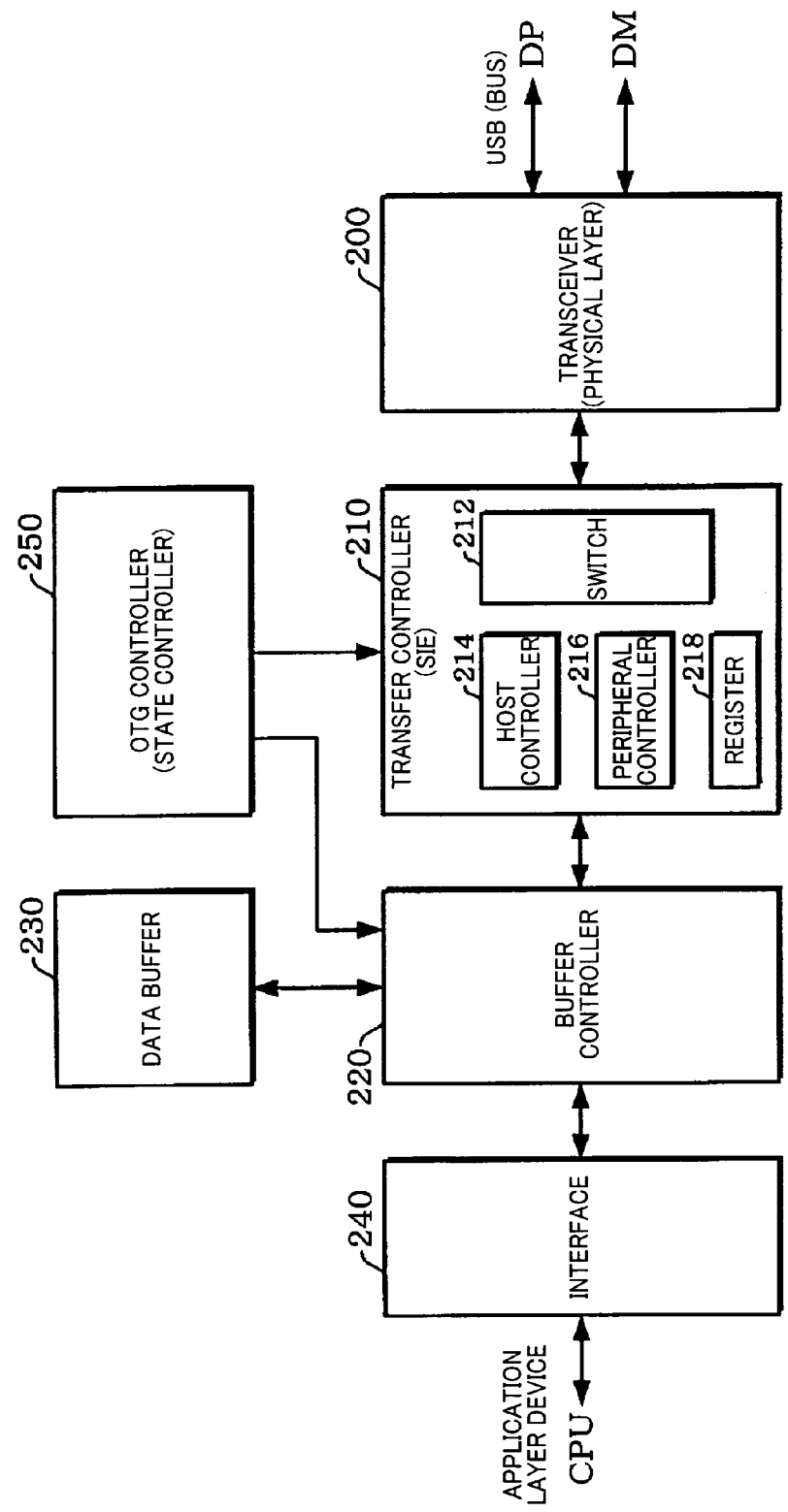
FIG. 11 shows a configuration example of an OTG data transfer control device implemented by an integrated circuit device according to one embodiment of the present invention.

FIG. 11 shows a configuration example of a data transfer control device which can implement the OTG dual-role device as a data transfer control device implemented by an integrated circuit device according to one embodiment of the present invention.

In FIG. 11, an OTG controller 250 (state controller in a broad sense) is further provided differing from FIG. 2. The OTG controller 250 is a circuit for implementing the SRP function and the HNP function in OTG Specifically, the OTG controller 250 controls a plurality of states including a state of the host operation in which the data transfer control device operates as a role of the host, a state of the peripheral operation in which the data transfer control device operates as a role of the peripheral, and the like.

Specifically, the OTG standard defines state transition of the dual-role device when operating as the A-device and state transition of the dual-role device when operating as the B-device. The OTG controller 250 includes a state machine for implementing the state transitions. The OTG controller 250 may include a circuit for detecting the USB line state, the VBUS level, and the ID pin state. The state machine included in the OTG controller 250 changes the state (state such as host, peripheral, suspend, or idle) based on the detected information. The state transition in this case may be implemented by a hardware circuit, or may be implemented by allowing firmware to set a state command in a register. When the state transition occurs, the OTG controller 250 controls VBUS or connection/disconnection of the pull-up resistor/pull-down resistor for the signals DP and DM based on the state after transition. The OTG controller 250 controls enabling/disabling of a host controller 214 and a peripheral controller 216.

A transfer controller 210 includes a switch circuit 212, a host controller (HC) 214, a peripheral controller (PC) 216, and a register section 218.

The switch circuit 212 controls switching of connection between a transceiver 200 and the host controller 214 or the peripheral controllers 216. The switch circuit 212 directs the transceiver 200 to generate the USB data (DP, DM) line state. For example, when the OTG controller 250 asserts an HC enable signal, the switch circuit 212 connects the transceiver 200 with the host controller 214. When the OTG controller 250 asserts a PC enable signal, the switch circuit 212 connects the transceiver 200 with the peripheral controller 216.

The host controller 214 is a controller which controls data transfer in the role of a host during the host operation (when the HC enable signal is asserted). Specifically, the host controller 214 is connected with the transceiver 200 by the switch circuit 212 during the host operation. The host controller 214 automatically generates a transaction to an endpoint based on transfer condition information set in the register section 218. The host controller 214 automatically transfers data (packet) (data transfer by a hardware circuit in which a processing unit does not take part) between pipe regions allocated in a data buffer 230 and endpoints corresponding to the pipe regions.

In more detail, the host controller 214 performs arbitration between a plurality of pipe transfers, time management in a frame, transfer scheduling, retransmission management, and the like. The host controller 214 manages the transfer condition information (operation information) of pipe transfer through the register section 218. The host controller 218 manages transactions, assembles/disassembles packets, and directs generation of a suspend/resume/reset state.

The peripheral controller 216 is a controller which controls data transfer in the role of the peripheral during the peripheral operation (when the PC enable signal is asserted).

Specifically, the peripheral controller 216 is connected with the transceiver 200 by the switch circuit 212 during the peripheral operation. The peripheral controller 216 controls data transfer between the endpoint region allocated in the data buffer 230 and the host based on the transfer condition information set in the register section 218.

Figure 12:
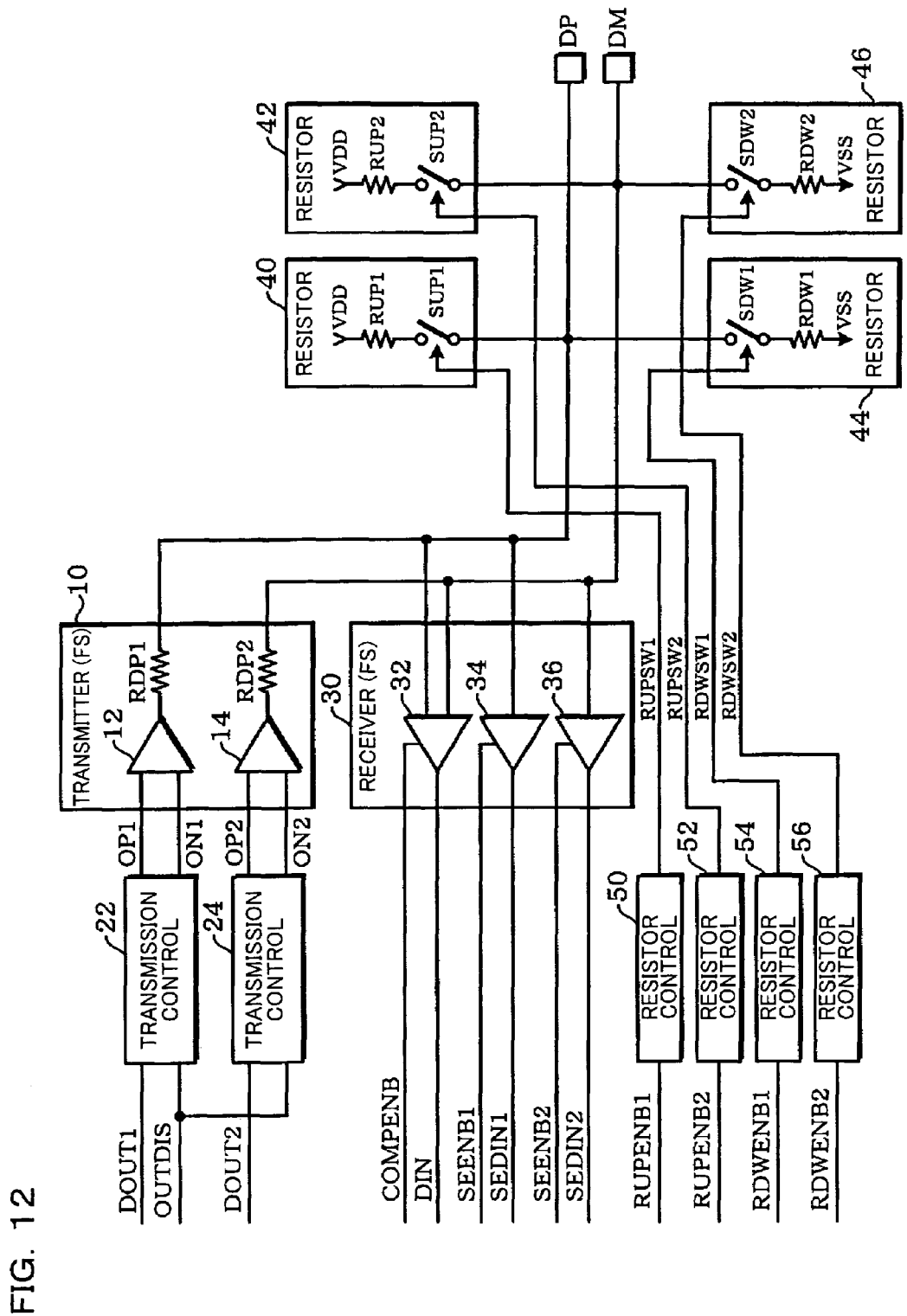
FIG. 12 shows a configuration example of an OTG physical layer circuit.

FIG. 12 shows a configuration example of a physical layer circuit (analog front-end) used in an OTG data transfer control device. FIG. 12 differs from FIG. 3 in that pull-down resistor circuits 44 and 46 and resistor control circuits 54 and 56 are further provided in FIG. 12. As described with reference to FIG. 10, the dual-role device operates not only as the peripheral, but also as the host. The pull-down resistor circuit 44 and the like are necessary during the host operation (when the host controller 214 operates).

The pull-down resistor circuit 44 is a circuit for pulling down the signal line for the signal DP, and is connected with the pad for the signal DP (first pad). The resistor circuit 44 includes a switch element SDW1 implemented by a transistor or the like, and a 15 Kohm pull-down resistor RDW1, for example. In more detail, one end of the switch element SDW1 is connected with the pad for the signal DP, and the other end is connected with one end of the resistor RDW1. The other end of the resistor RDW1 is connected with the power supply VSS.

The resistor circuit 46 is a circuit for pulling down the signal line for the signal DM, and is connected with the pad for the signal DM (second pad). The resistor circuit 46 includes a switch element SDW2 implemented by a transistor or the like, and a pull-down resistor RDW2. In more detail, one end of the switch element SDW2 is connected with the pad for the signal DM, and the other end is connected with one end of the resistor RDW2. The other end of the resistor RDW2 is connected with the power supply VSS.

In FIG. 12, the resistors RDW1 and RDW2 are provided on the side of the power supply VSS. However, the switch elements SDW1 and SDW2 may be provided on the side of the power supply VSS.

The resistor control circuits 54 and 56 are circuits for respectively controlling the resistor circuits 44 and 46. In more detail, the resistor control circuits 54 and 56 receive pull-down enable signals RDWENB1 and RDWENB2 from the circuit in the preceding stage (circuit in the macrocell MC2, for example). The resistor control circuits 54 and 56 generate signals RDWSW1 and RDWSW2 which control ON/OFF of the switch elements SDW1 and SDW2, and output the signals RDWSW1 and RDWSW2 to the resistor circuits 44 and 46.

Figure 13:
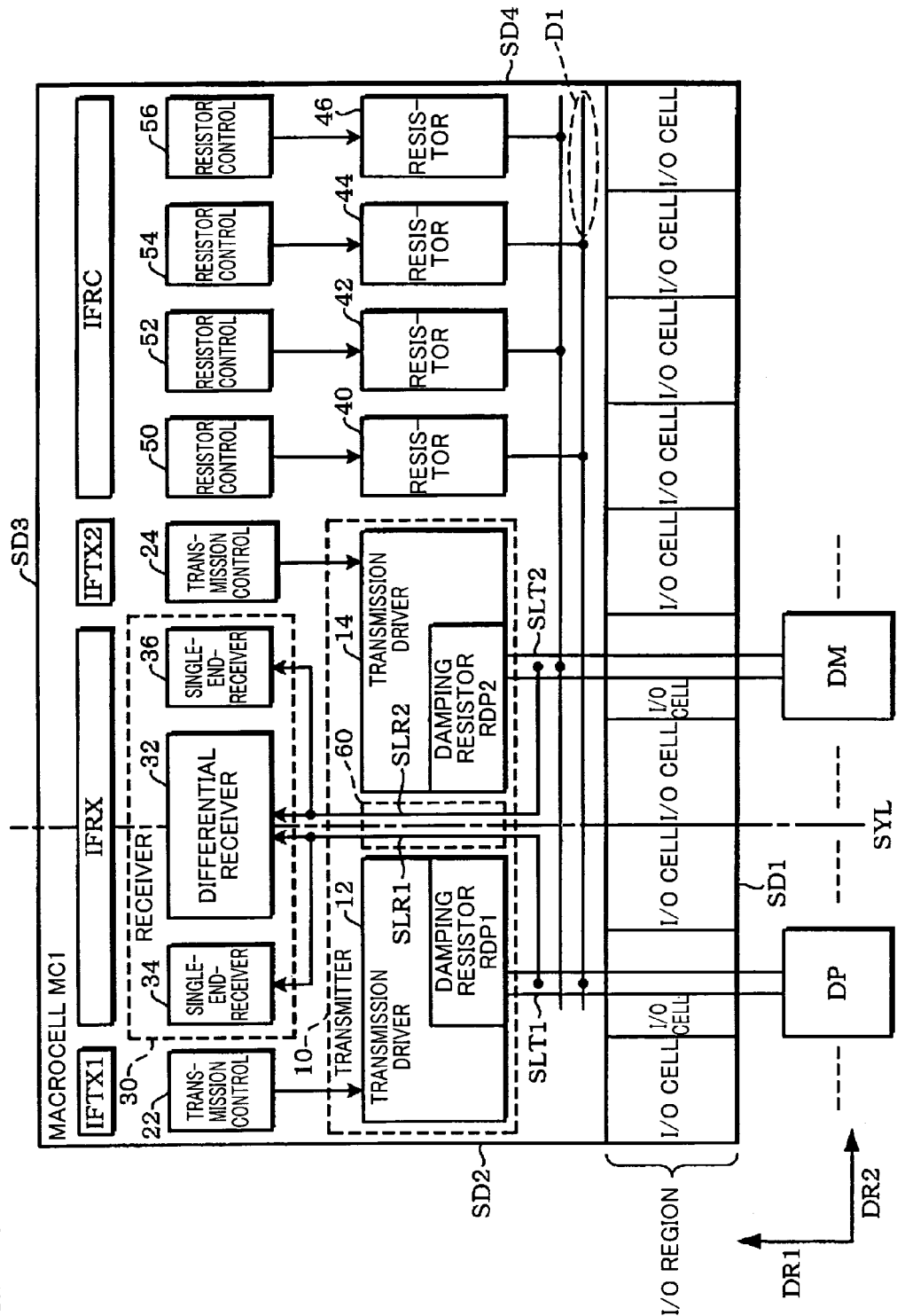
FIG. 13 shows a layout example of the macrocell MC1 in OTG.

FIG. 13 shows a layout example of the macrocell MC1 for OTG FIG. 13 differs from FIGS. 5 and 9 in that the pull-down resistor circuits 44 and 46 and the resistor control circuits 54 and 56 are further provided in FIG. 13. In FIG. 13, the pull-down resistor circuits 44 and 46 are disposed on the second direction DR2 side of the transmitter circuit 10 (transmission drivers 12 and 14). The resistor control circuits 54 and 56 are disposed on the first direction DR1 side of the resistor circuits 44 and 46.

The resistor circuits 44 and 46 are disposed to be closer by disposing the resistor circuits 44 and 46 (and the resistor control circuits 54 and 56) on the second direction DR2 side of the transmitter circuit 10 instead of line-symmetrically disposing the resistor circuits 44 and 46 (and the resistor control circuits 54 and 56). This enables the resistance and the parasitic capacitance of the resistor circuit 44 to be made approximately equal to the resistance and the parasitic capacitance of the resistor circuit 46 even if the manufacturing process varies. If a dummy interconnect which is originally unnecessary is provided as indicated by D1 in FIG. 13, the interconnect lengths for the signals DP and DM can be made equal even if the resistor circuits 44 and 46 are not line-symmetrically disposed. As a result, a problem in which the signal characteristics for the signals DP and DM deteriorate can be prevented.

According to the layout method shown in FIG. 13, the macrocell MC1 corresponding to USB OTG can be easily created merely by disposing the resistor circuits 44 and 46 and the resistor control circuits 54 and 56 adjacent to the resistor circuits 40 and 42 and the resistor control circuits 50 and 52 shown in FIGS. 5 and 9. If the resistor control circuits 50, 52, 54, and 56 are adjacently disposed as shown in FIG. 13, the resistor control interface region IFRC can be fixed on the first direction DR1 side of the resistor control circuits 50, 52, 54, and 56. This enables the interface between the macrocells MC1 and MC2 to be simplified, whereby a stable circuit operation can be ensured even if the circuit configuration and the scale of the macrocell MC2 are changed. Moreover, the setting of the routing condition of the automatic placement and routing is facilitated, whereby the routing efficiency of the automatic placement and routing of the macrocell MC2 can be improved.

9. Electronic Instrument

Figure 14:
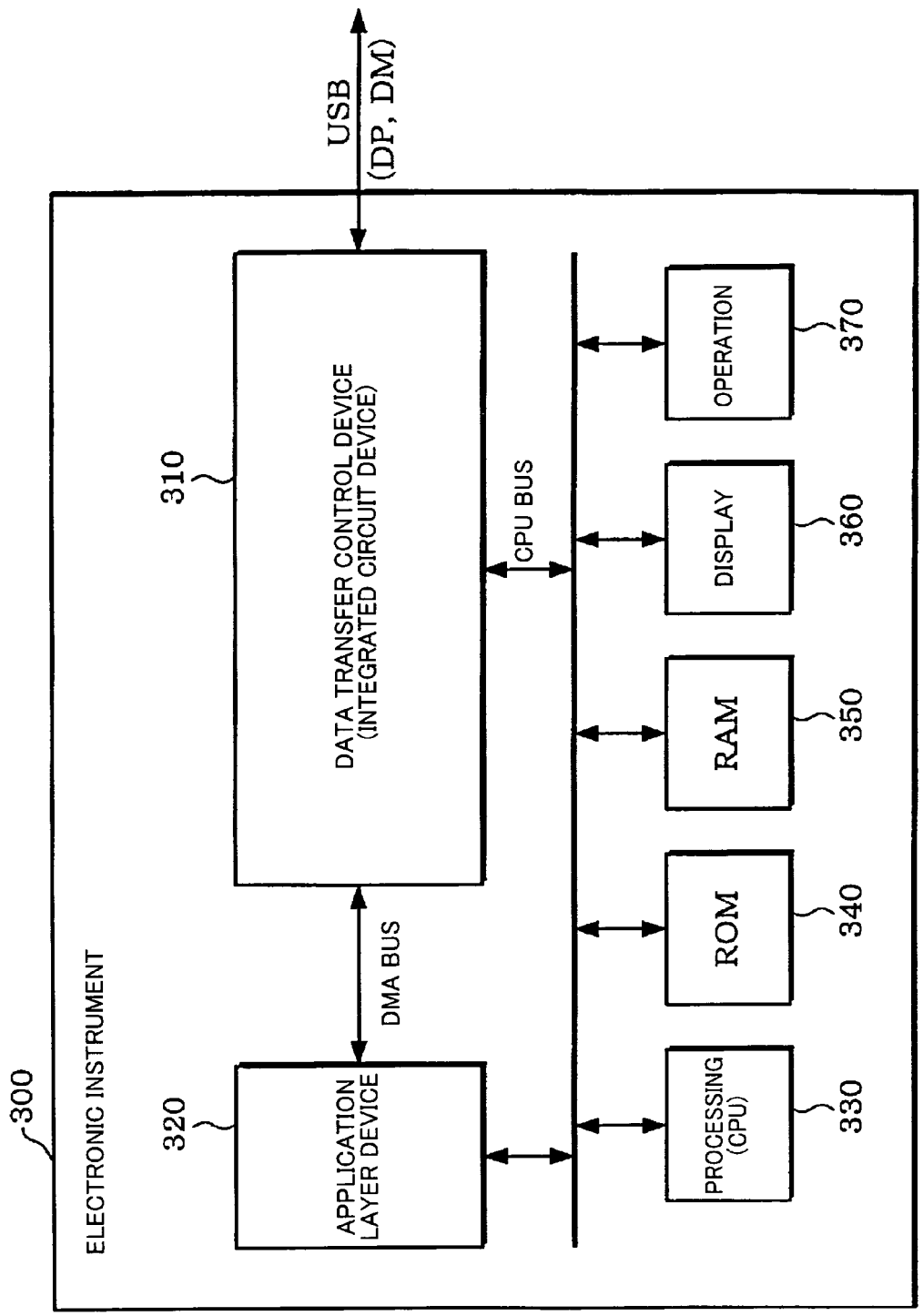
FIG. 14 shows a configuration example of an electronic instrument including a data transfer control device implemented by an integrated circuit device according to one embodiment of the present invention.

FIG. 14 shows a configuration example of an electronic instrument including a data transfer control device implemented by an integrated circuit device (macrocell) according to one embodiment of the present invention. An electronic instrument 300 includes a data transfer control device 310 (integrated circuit device) described in this embodiment, an application layer device 320 formed by an ASIC or the like, a CPU 330, a ROM 340, a RAM 350, a display section 360, and an operation section 370. The electronic instrument 300 may have a configuration in which some of these functional blocks are omitted.

The application layer device 320 is a device which implements an application engine of a portable telephone, a device which controls a drive of an information storage medium (hard disk or optical disk), a device which controls a printer, a device including an MPEG encoder and an MPEG decoder, or the like. The processing section 330 (CPU) controls the data transfer control device 310 and the entire electronic instrument. The ROM 340 stores a control program and various types of data. The RAM 350 functions as a work area and a data storage area for the processing section 330 and the data transfer control device 310. The display section 360 displays various types of information to the user. The operation section 370 allows the user to operate the electronic instrument.

In FIG. 14, a DMA bus and a CPU bus are separated. However, these buses may be one common bus. A processing section which controls the data transfer control device 310 and a processing section which controls the electronic instrument may be provided independently. As examples of electronic instruments to which this embodiment can be applied, portable telephones, optical disk (CD-ROM and DVD) drives, magneto-optical (MO) disk drives, hard disk drives, TVs, TV tuners, VTRs, video cameras, audio devices, projectors, personal computers, electronic notebooks, PDAs, word processors, and the like can be given.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

Any term (such as USB, DP, DM, a pad for DP, a pad for DM, VDD and VSS) cited with a different term having broader or the same meaning (such as a given interface standard, a first signal, a second signal, a first pad, a second pad, a first power supply, and a second power supply) at least once in this specification and drawings can be replaced by the different term in any place in this specification and drawings.

The data transfer control device implemented by the present invention is not limited to the configurations shown in FIGS. 2, 11, etc. It is possible to make various modifications. The layout of the macrocell of the present invention is not limited to the configurations shown in FIGS. 5, 9, 13, etc. It is possible to make various modifications. The present invention is preferably applied to a USB FS and OTG physical layer circuit. However, the present invention is not limited thereto.

What is claimed is:

1. A macrocell which includes at least a circuit of a physical layer of a given interface standard in which data is transferred using differential signals, the macrocell comprising:

a transmitter circuit which is connected with a first pad for a first signal which forms the differential signals and a second pad for a second signal which forms the differential signals; and a receiver circuit connected with the first and second pads, wherein the transmitter circuit includes a first transmission driver which drives a first signal line connected with the first pad, and a second transmission driver which drives a second signal line connected with the second pad, and wherein the first and second transmission drivers of the transmitter circuit are disposed on a first direction side of the first and second pads and are disposed line-symmetrically about a first line as a symmetry axis, and the receiver circuit is disposed on the first direction side of the transmitter circuit, the first direction being a direction from a first side of the macrocell towards a third side opposite to the first side, and the first line extending along the first direction.

2. The macrocell as defined in claim 1, wherein a routing region is disposed in a region between the first and second transmission drivers, the routing region being provided for routing a third signal line and a fourth signal line which are respectively provided for connecting the receiver circuit with the first and second pads along the first direction.

3. The macrocell as defined in claim 2, wherein the third and fourth signal lines in the routing region are routed at line widths smaller than line widths of the first and second signal lines which respectively connect the transmitter circuit with the first and second pads.

4. The macrocell as defined in claim 2, wherein a shield line is routed in the routing region along the third and fourth signal lines.

5. The macrocell as defined in claim 1, wherein the first and second pads are disposed line-symmetrically about the first line as a symmetry axis.

6. The macrocell as defined in claim 1, wherein the transmitter circuit includes first and second damping resistors which are connected with the first and second pads, respectively, and wherein the first and second damping resistors are disposed line-symmetrically about the first line as a symmetry axis.

7. The macrocell as defined in claim 1, wherein the receiver circuit includes a differential receiver connected with the first and second pads, a first single-end-receiver connected with the first pad, and a second single-end-receiver connected with the second pad.

8. The macrocell as defined in claim 1, wherein first and second transmission control circuits for respectively controlling the first and second transmission drivers are disposed on the first direction side of the transmitter circuit, and wherein the receiver circuit is disposed in a region between the first and second transmission control circuits.

9. The macrocell as defined in claim 8, wherein a reception interface region and a transmission interface region are disposed along the third side of the macrocell, the reception interface region being provided for interfacing a signal between the receiver circuit and a second macrocell which includes an upper layer circuit of the physical layer, and the transmission interface region being provided for interfacing a signal between the second macrocell and the first and second transmission control circuits.

10. The macrocell as defined in claim 1, comprising:

a first resistor circuit for pull-up and a second resistor circuit as a dummy, the first resistor circuit being connected with the first pad and the second resistor circuit being connected with the second pad, wherein the first and second resistor circuits are disposed on a second direction side of the transmitter circuit, the second direction being a direction from a second side of the macrocell towards a fourth side opposite to the second side.

11. The macrocell as defined in claim 10, comprising:
a third resistor circuit for pull-down and a fourth resistor circuit for pull-down, the third resistor circuit being connected with the first pad and the fourth resistor circuit being connected with the second pad,
wherein the third and fourth resistor circuits are disposed on the second direction side of the transmitter circuit.

12. The macrocell as defined in claim 11, wherein the third and fourth resistor circuits are resistor circuits for Universal Serial Bus (USB) On-The-Go (OTG).

13. The macrocell as defined in claim 10,
wherein first and second resistor control circuits for respectively controlling the first and second resistor circuits are disposed on the first direction side of the first and second resistor circuits.

14. The macrocell as defined in claim 13,
wherein a resistor control interface region is disposed along the third side of the macrocell, the resistor control interface region being provided for interfacing a signal between the first and second resistor control circuits and a second macrocell which includes an upper layer circuit of the physical layer.

15. The macrocell as defined in claim 1,
wherein the given interface standard is a Universal Serial Bus (USB) standard, and the transmitter circuit and the receiver circuit are circuits for USB full speed mode.

16. The macrocell as defined in claim 1,
wherein, when an entire I/O region of the macrocell is disposed to overlap a part of an I/O region of a second macrocell which includes an upper layer circuit of the physical layer, and when a length of the first side of the macrocell is denoted by L and a pitch of I/O cells disposed in the I/O region of the second macrocell is denoted by PL, $L = PL \times N$ (N is an integer larger than one) is satisfied.

17. An integrated circuit device which includes a plurality of macrocells, comprising:
the macrocell as defined in claim 1; and
a second macrocell which includes an upper layer circuit of the physical layer.

18. An electronic instrument, comprising:
the integrated circuit device as defined in claim 17; and
a processing section which controls the integrated circuit device.

19. The macrocell as defined in claim 1,
the first and second transmission drivers being disposed between the first and second pads and the receiver circuit.

20. The macrocell as defined in claim 1,
the layout positions of the first and second transmission drivers being disposed line-symmetrically about the first line as the symmetry axis.

21. A macrocell which includes at least a circuit of a physical layer of a given interface standard in which data is transferred using differential signals, the macrocell comprising:
a transmitter circuit which is connected with a first pad for a first signal which forms the differential signals and a second pad for a second signal which forms the differential signals;
a receiver circuit connected with the first and second pads; and
a first resistor circuit for pull-up and a second resistor circuit as a dummy, the first resistor circuit being connected with the first pad and the second resistor circuit being connected with the second pad,
wherein the transmitter circuit includes a first transmission driver which drives a first signal line connected with the first pad, and a second transmission driver which drives a second signal line connected with the second pad,
wherein the first and second transmission drivers of the transmitter circuit are disposed on a first direction side of the first and second pads and are disposed line-symmetrically about a first line as a symmetry axis, the first direction being a direction from a first side of the macrocell towards a third side opposite to the first side, and the first line extending along the first direction, and
wherein the first and second resistor circuits are disposed on a second direction side of the transmitter circuit, the second direction being a direction from a second side of the macrocell towards a fourth side opposite to the second side.

22. The macrocell as defined in claim 21, comprising:
a third resistor circuit for pull-down and a fourth resistor circuit for pull-down, the third resistor circuit being connected with the first pad and the fourth resistor circuit being connected with the second pad,
wherein the third and fourth resistor circuits are disposed on the second direction side of the transmitter circuit.

23. The macrocell as defined in claim 22, wherein the third and fourth resistor circuits are resistor circuits for Universal Serial Bus (USB) On-The-Go (OTG).

24. The macrocell as defined in claim 21,
wherein first and second resistor control circuits for respectively controlling the first and second resistor circuits are disposed on the first direction side of the first and second resistor circuits.

25. The macrocell as defined in claim 24,
wherein a resistor control interface region is disposed along the third side of the macrocell, the resistor control interface region being provided for interfacing a signal between the first and second resistor control circuits and a second macrocell which includes an upper layer circuit of the physical layer.

26. The macrocell as defined in claim 21,
wherein the given interface standard is a Universal Serial Bus (USB) standard, and the transmitter circuit and the receiver circuit are circuits for USB full speed mode.

27. The macrocell as defined in claim 21,
wherein, when an entire I/O region of the macrocell is disposed to overlap a part of an I/O region of a second macrocell which includes an upper layer circuit of the physical layer, and when a length of the first side of the macrocell is denoted by L and a pitch of I/O cells disposed in the I/O region of the second macrocell is denoted by PL, $L = PL \times N$ (N is an integer larger than one) is satisfied.

28. An integrated circuit device which includes a plurality of macrocells, comprising:
the macrocell as defined in claim 21; and
a second macrocell which includes an upper layer circuit of the physical layer.

29. An electronic instrument, comprising:
the integrated circuit device as defined in claim 28; and a processing section which controls the integrated circuit device.

30. A macrocell which includes at least a circuit of a physical layer of a given interface standard in which data is transferred using differential signals, the macrocell comprising:

a transmitter circuit which is connected with a first pad for a first signal which forms the differential signals and a second pad for a second signal which forms the differential signals:

a receiver circuit connected with the first and second pads;

a plurality of I/O cells disposed along a second direction which is perpendicular to a first direction;

the transmitter circuit including a first transmission driver which drives a first signal line connected with the first pad, and a second transmission driver which drives a second signal line connected with the second pad; and the first and second transmission drivers of the transmitter circuit being disposed in the first direction of the first and second pads and the layout positions of the first and second transmission drivers being disposed line-symmetrically about a first line as a symmetry axis, and the receiver circuit is disposed in the first direction of the transmitter circuit.

* * * * *